(12) United States Patent
Darbyshire et al.

(10) Patent No.: US 9,469,404 B2
(45) Date of Patent: Oct. 18, 2016

(54) AIRCRAFT PASSENGER SEAT

(71) Applicant: British Airways Plc, Harmondsworth, West Drayton (GB)

(72) Inventors: Martin Darbyshire, London (GB); Matthew Round, London (GB); Asa Dancy Herring, III, Winston Salem, NC (US); Dennis Isaac Waldrip, Winston Salem, NC (US); Marc Schatell, Winston Salem, NC (US); Alen Wyss, Winston Salem, NC (US); Gregory Hall, Winston Salem, NC (US); Walter Sutcavage, Winston Salem, NC (US); John Lovingood, Winston Salem, NC (US); Dan Alford, Winston Salem, NC (US)

(73) Assignee: British Airways Plc (GB)

( * ) Notice: Subject to any disclaimer, the term of this patent is extended or adjusted under 35 U.S.C. 154(b) by 0 days.

(21) Appl. No.: 14/083,224

(22) Filed: Nov. 18, 2013

(65) Prior Publication Data

US 2014/0084647 A1   Mar. 27, 2014

Related U.S. Application Data

(63) Continuation of application No. 13/557,096, filed on Jul. 24, 2012, now Pat. No. 8,616,643, which is a continuation of application No. 12/158,637, filed as application No. PCT/GB2006/004901 on Dec. 22, 2006, now abandoned.

(30) Foreign Application Priority Data

Dec. 23, 2005   (GB) .................................. 0526434.6
Nov. 10, 2006   (GB) .................................. 0622470.3

(51) Int. Cl.
*B64D 11/06*   (2006.01)

(52) U.S. Cl.
CPC ............. *B64D 11/06* (2013.01); *B64D 11/064* (2014.12); *B64D 11/0604* (2014.12); *B64D 11/0606* (2014.12); *B64D 11/0641* (2014.12); *B64D 11/0643* (2014.12); *B64D 11/0646* (2014.12)

(58) Field of Classification Search
CPC .............. B64D 11/06; B64D 11/0601; B64D 11/0606; B64D 11/06395
See application file for complete search history.

(56) References Cited

U.S. PATENT DOCUMENTS 4,473,201 A    9/1984  Barnes et al.
5,096,271 A *  3/1992  Portman ........................ 312/7.2

(Continued)

*Primary Examiner* — Philip Gabler
(74) *Attorney, Agent, or Firm* — Sterne, Kessler, Goldstein & Fox P.L.L.C.

(57) ABSTRACT

An aircraft passenger seat comprises a primary seat (1) having a seat back (3) and a seat pan (4), and a secondary support surface (5) located or locatable opposite the primary, seat (1), the passenger seat being able to adopt each of an upright configuration, a reclined configuration and a substantially flat configuration, such that in the reclined configuration, the primary seat (1) is reclined relative to the upright configuration and the secondary support surface (5) is angled upwardly towards the primary seat (1) so as to support the lower leg(s) of a passenger seated in the primary seat (1); and in the substantially flat configuration, the secondary support surface (5) is substantially horizontal and the seat back (3), the seat pan (4) and the secondary support surface (5) form a substantially flat and continuous surface wherein the secondary support surface (5) is rotatable about an axis between the reclined and substantially flat configurations, said axis being translated between the reclined and substantially flat configurations.

12 Claims, 36 Drawing Sheets

(56) References Cited

U.S. PATENT DOCUMENTS

| | | | |
|---|---|---|---|
| 5,108,857 A * | 4/1992 | Kitayama et al. | 430/4 |
| 5,954,401 A * | 9/1999 | Koch et al. | 297/354.13 |
| 6,170,786 B1 | 1/2001 | Park et al. | |
| 2001/0000639 A1 | 5/2001 | Park et al. | |
| 2003/0085597 A1 * | 5/2003 | Ludeke et al. | 297/184.14 |
| 2005/0194827 A1 | 9/2005 | Dowty et al. | |
| 2006/0001302 A1 * | 1/2006 | Achilles et al. | 297/284.1 |
| 2006/0219843 A1 * | 10/2006 | Martin | 244/118.6 |
| 2008/0265638 A1 * | 10/2008 | Strasser et al. | 297/217.1 |
| 2012/0038587 A1 * | 2/2012 | Alford | B64D 11/06 345/174 |
| 2013/0113250 A1 * | 5/2013 | Udriste | B64D 11/06 297/217.3 |
| 2015/0284083 A1 * | 10/2015 | Mayer | B64D 11/0023 244/118.5 |

* cited by examiner

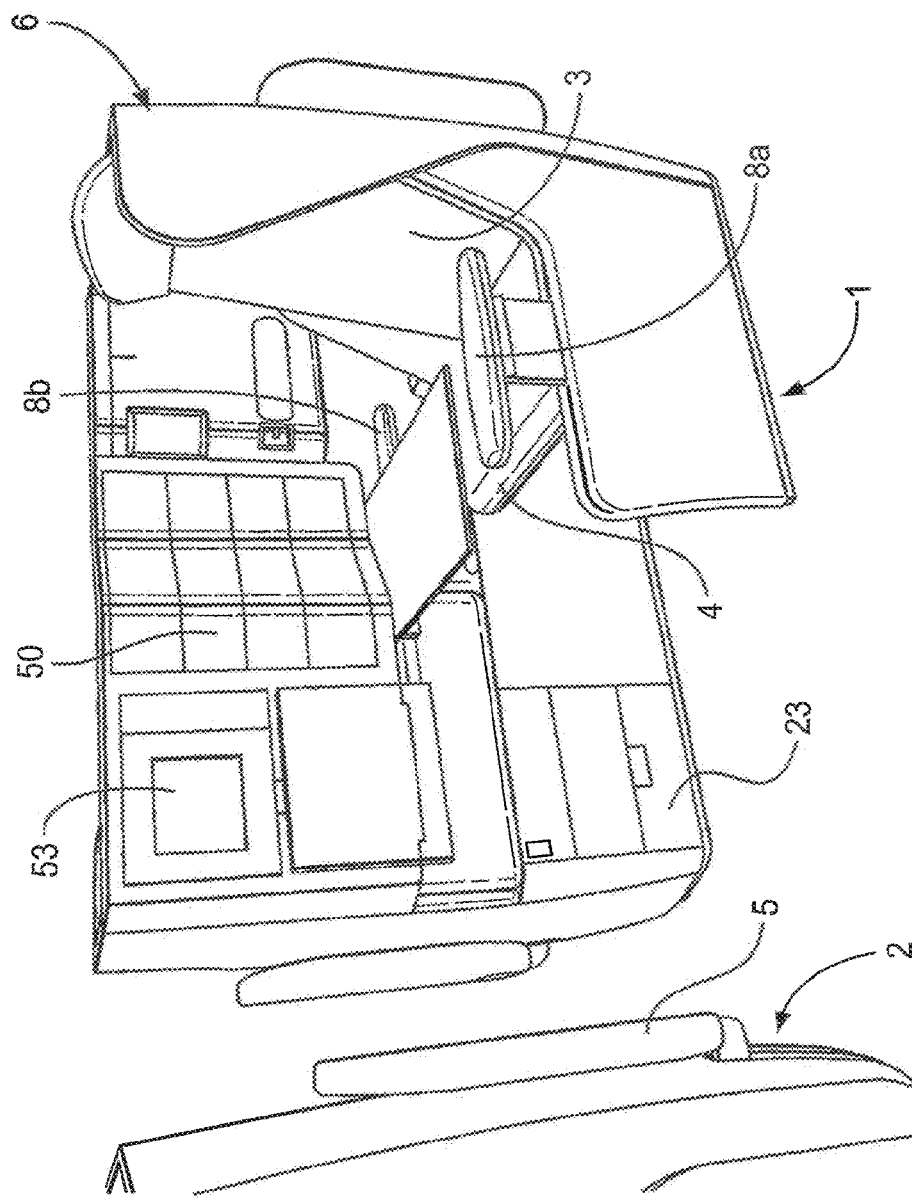

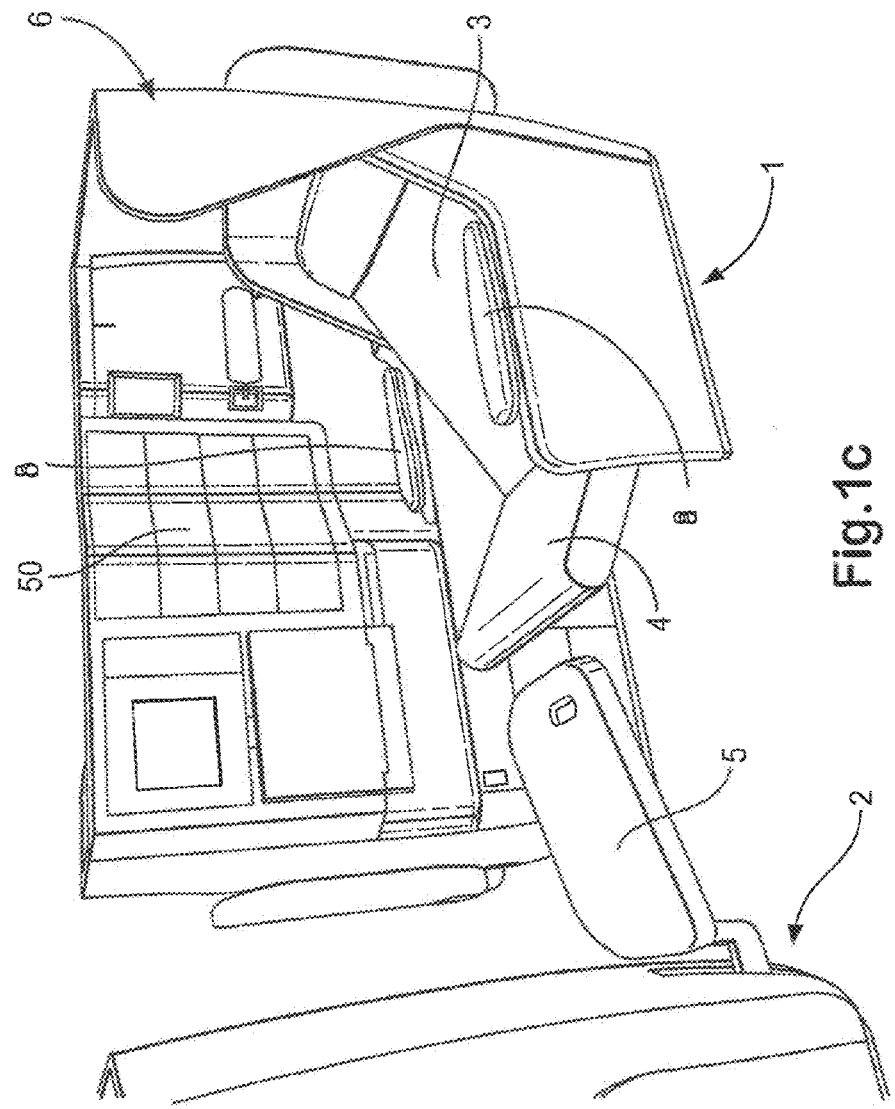

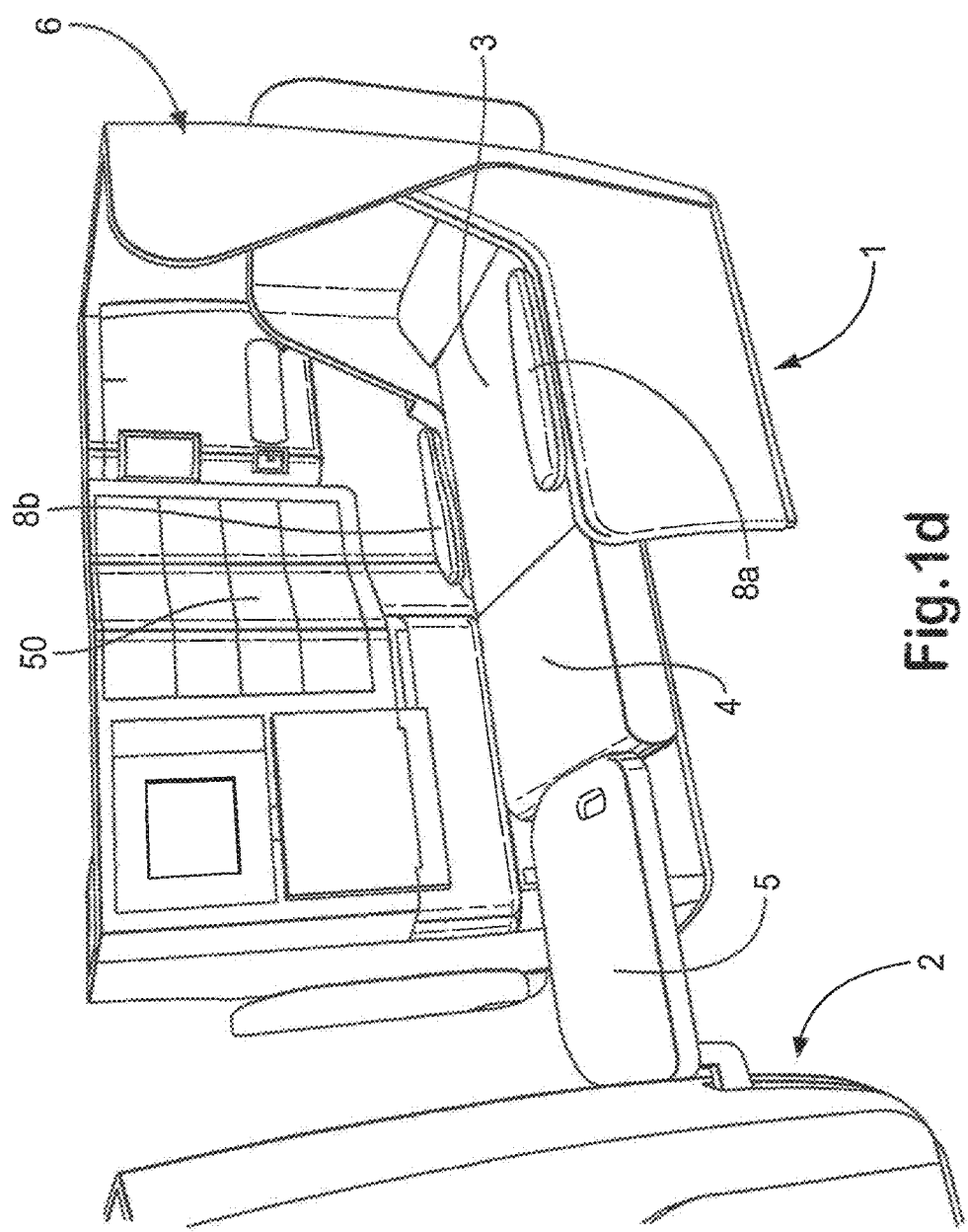

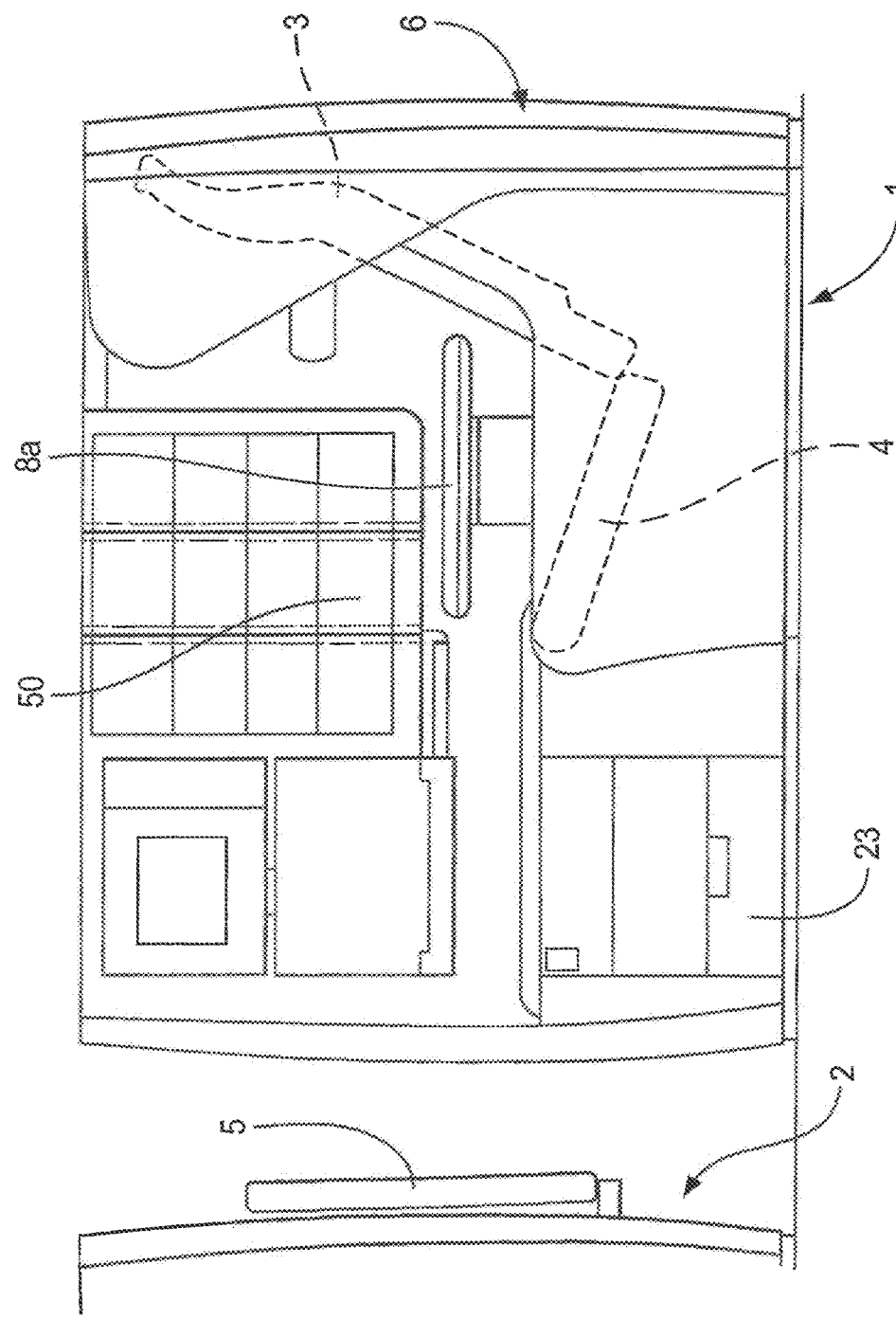

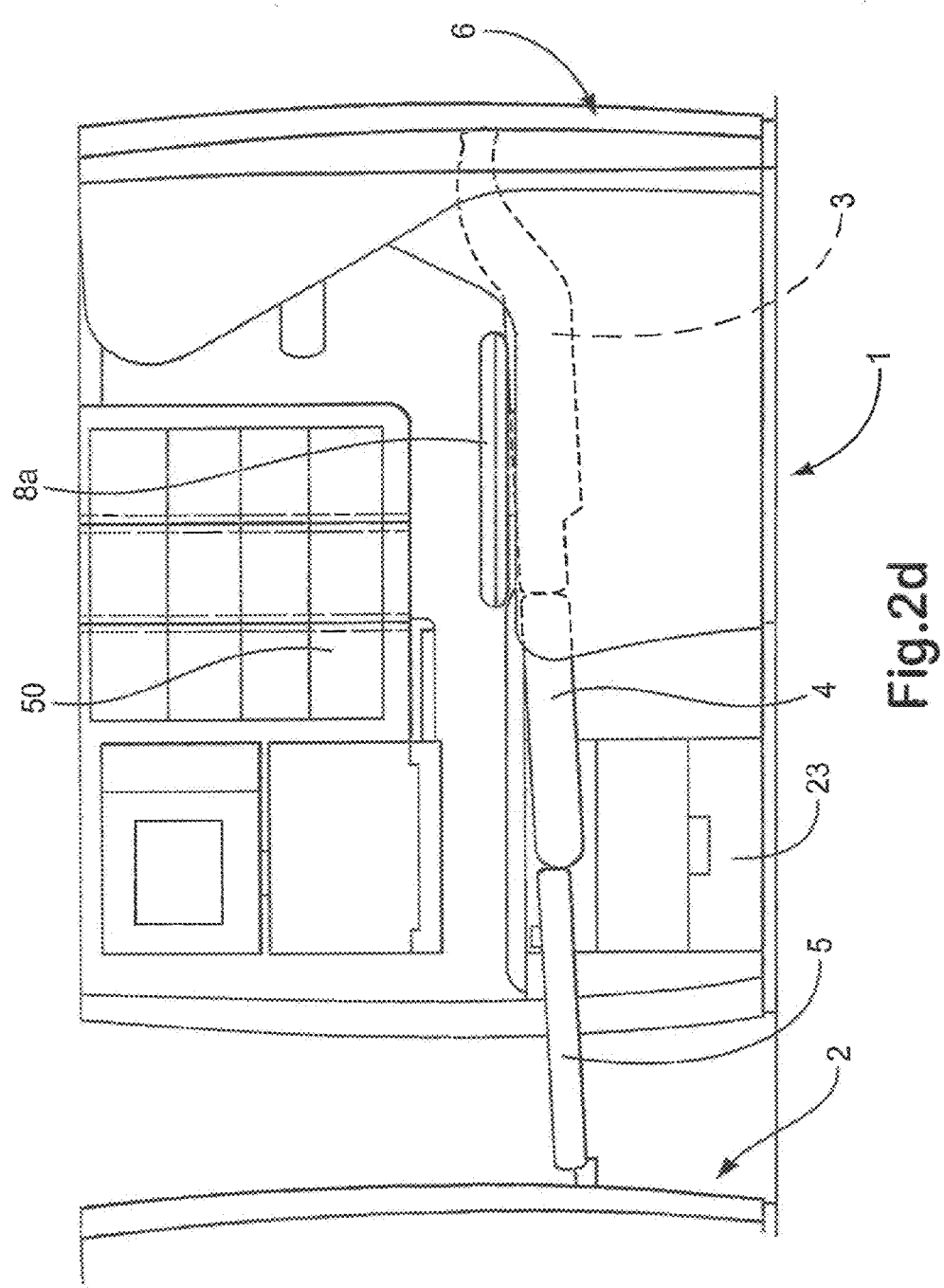

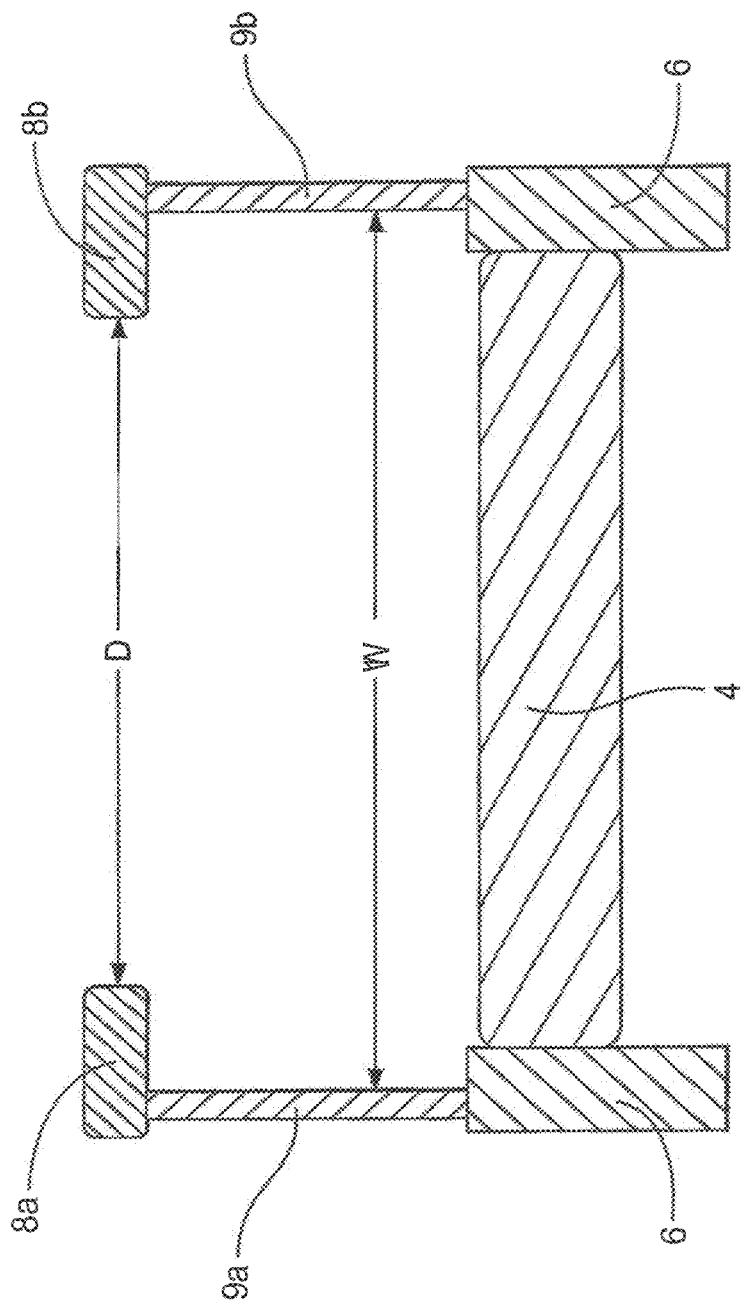

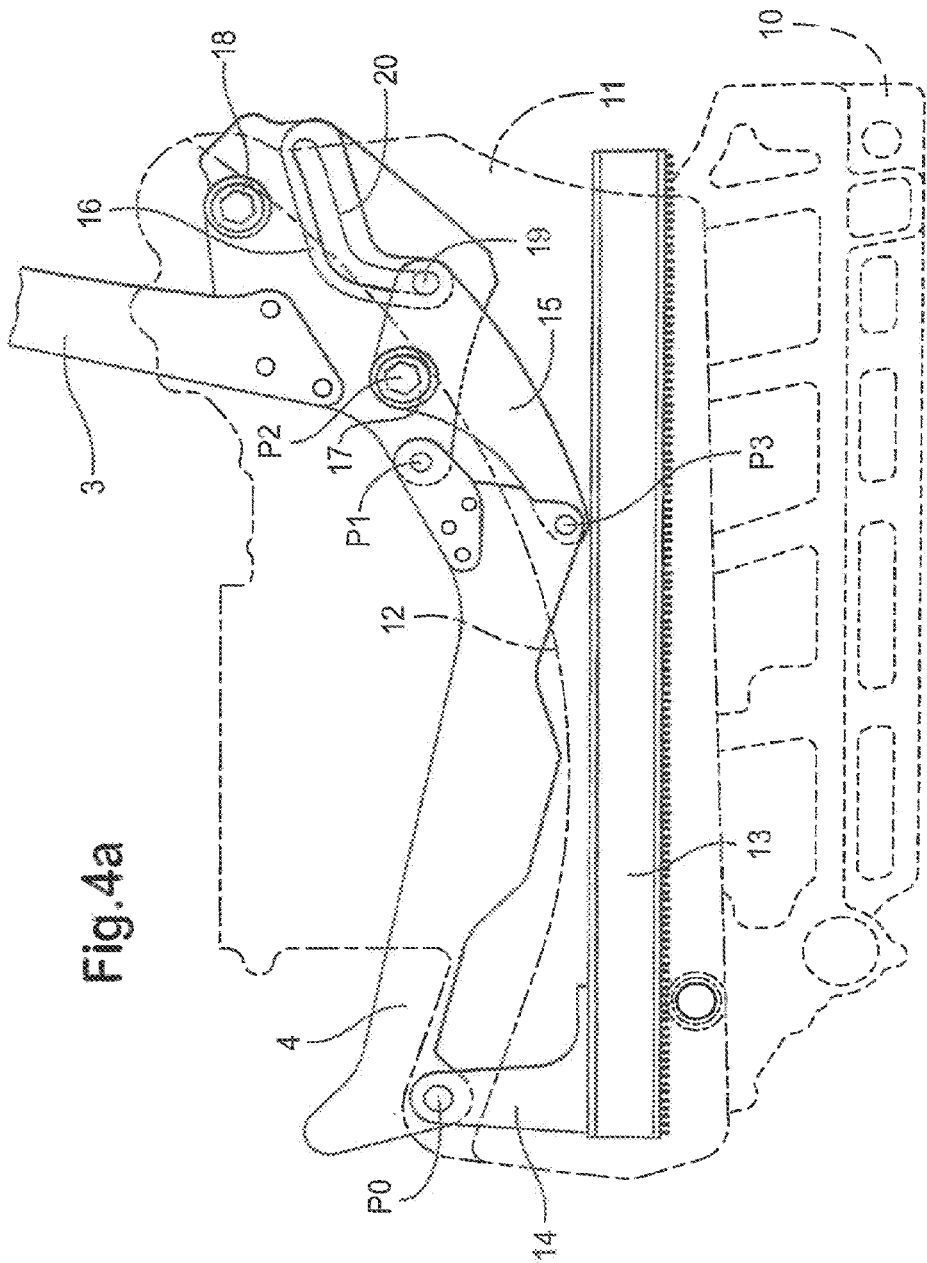

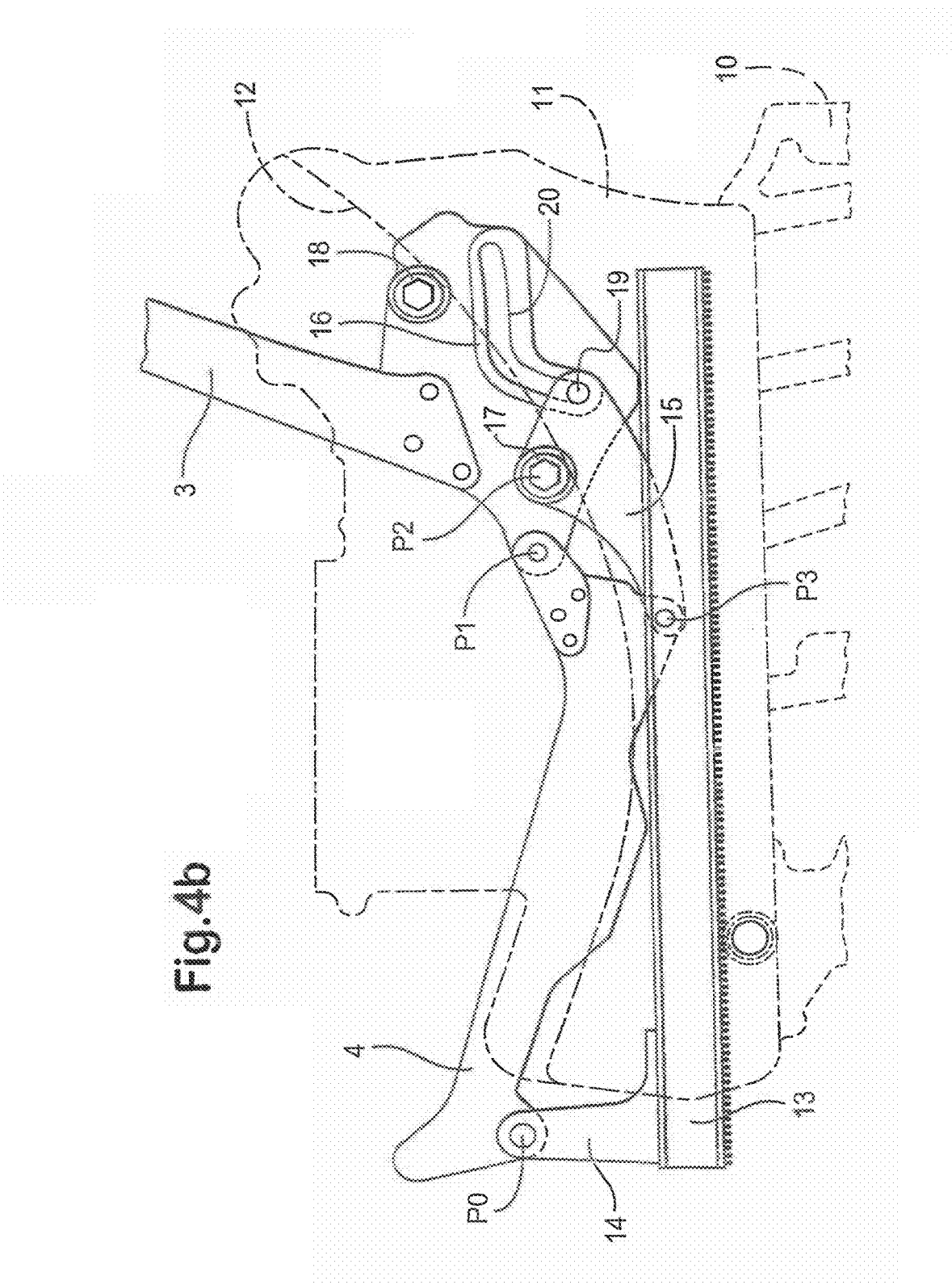

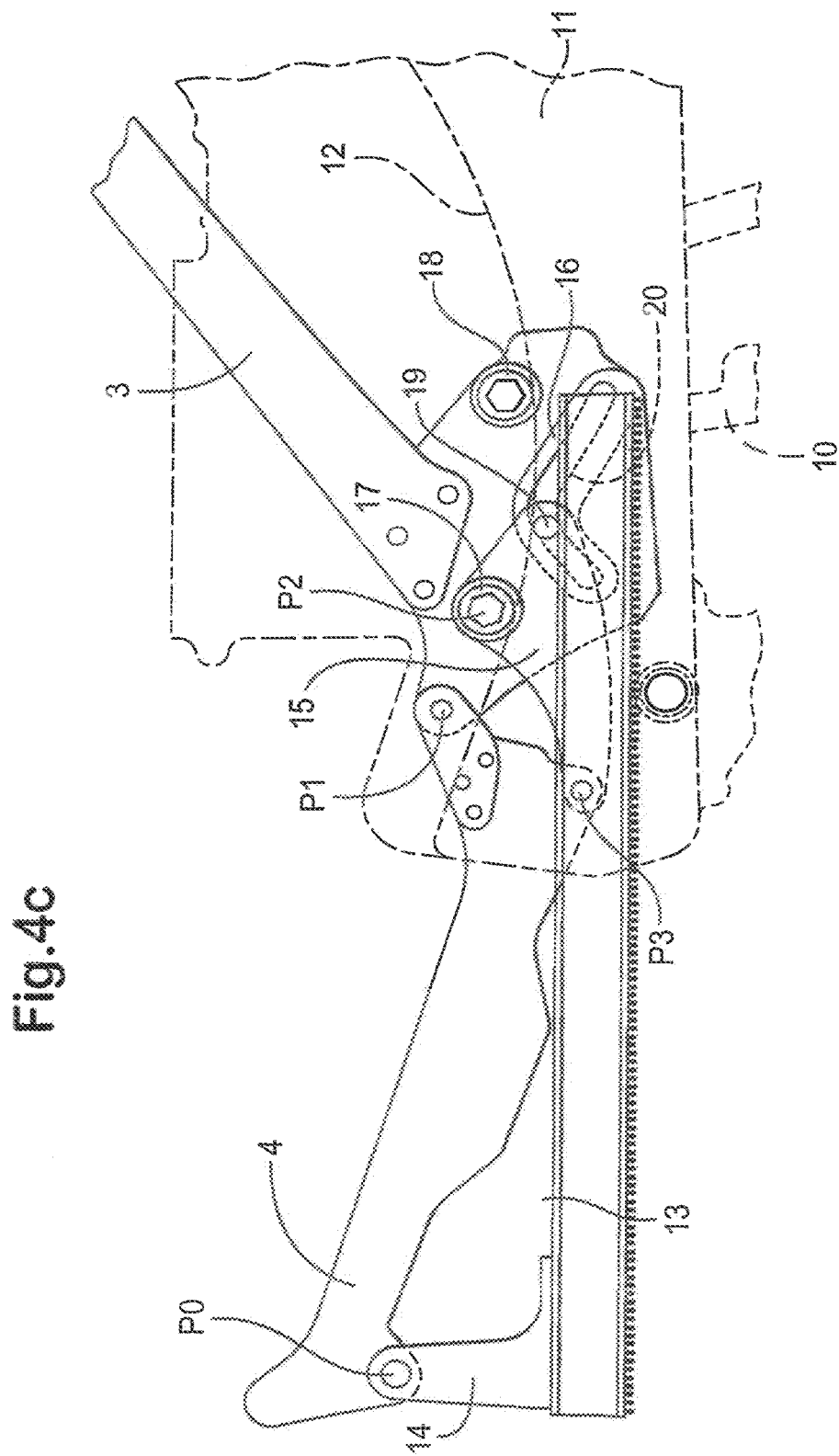

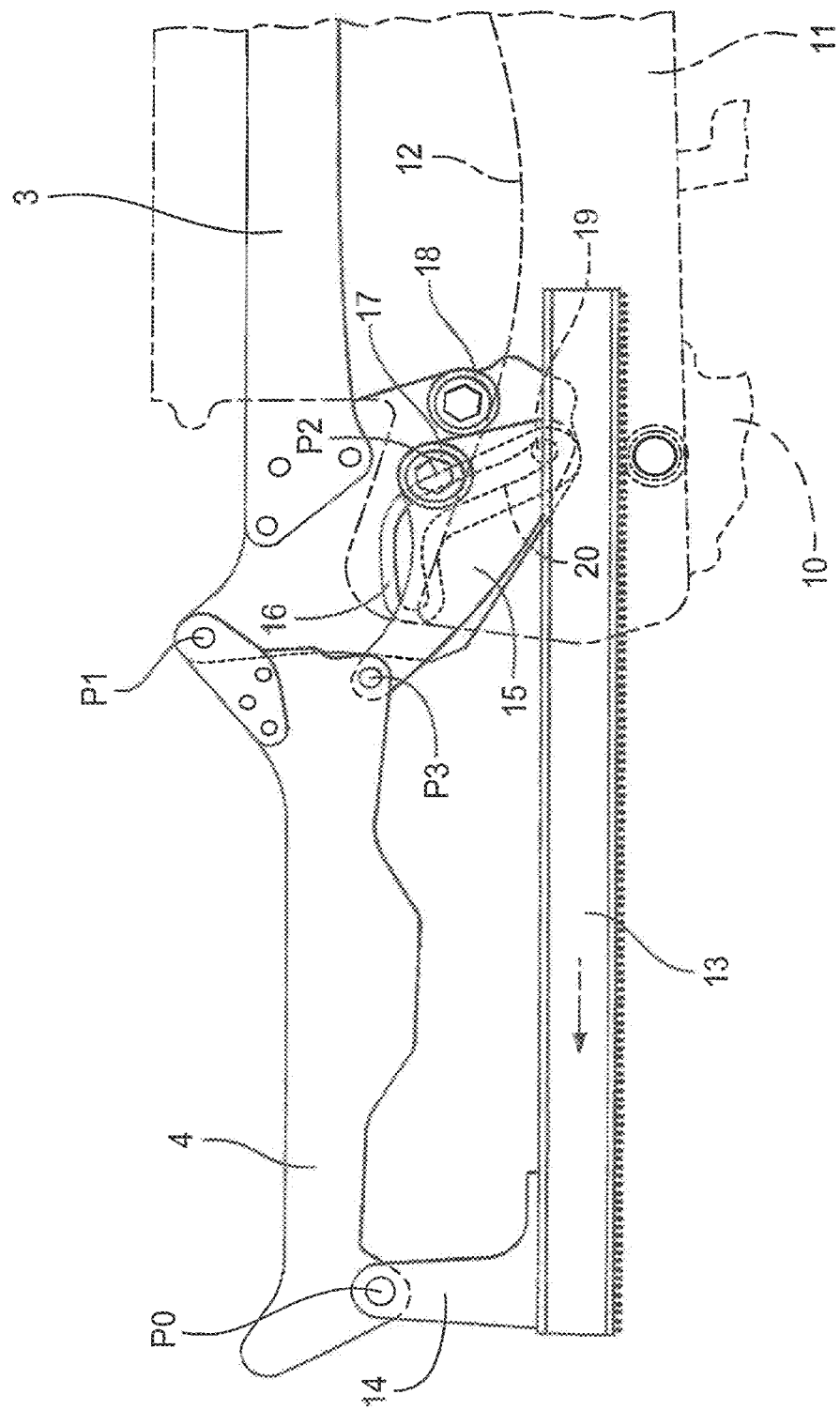

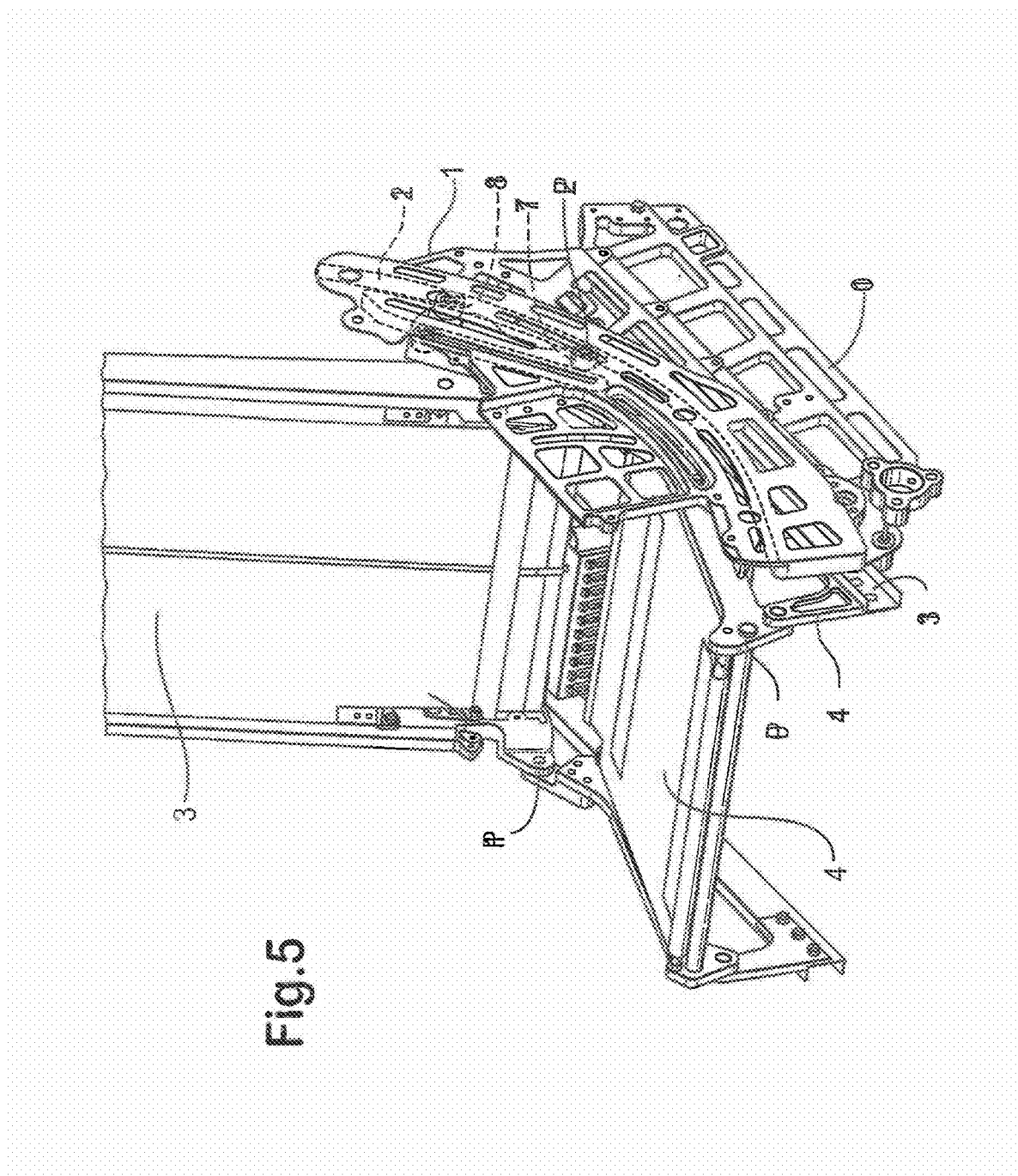

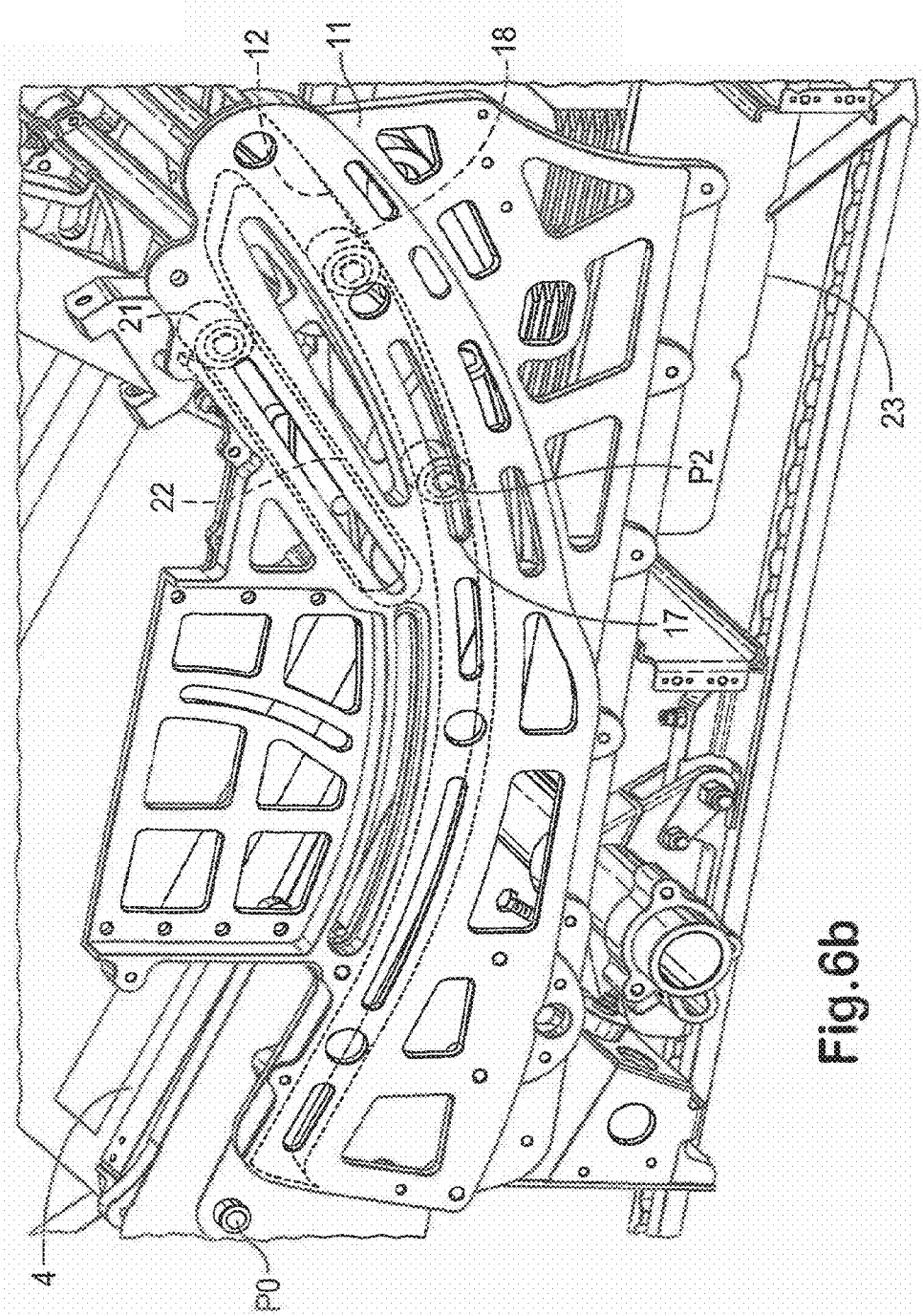

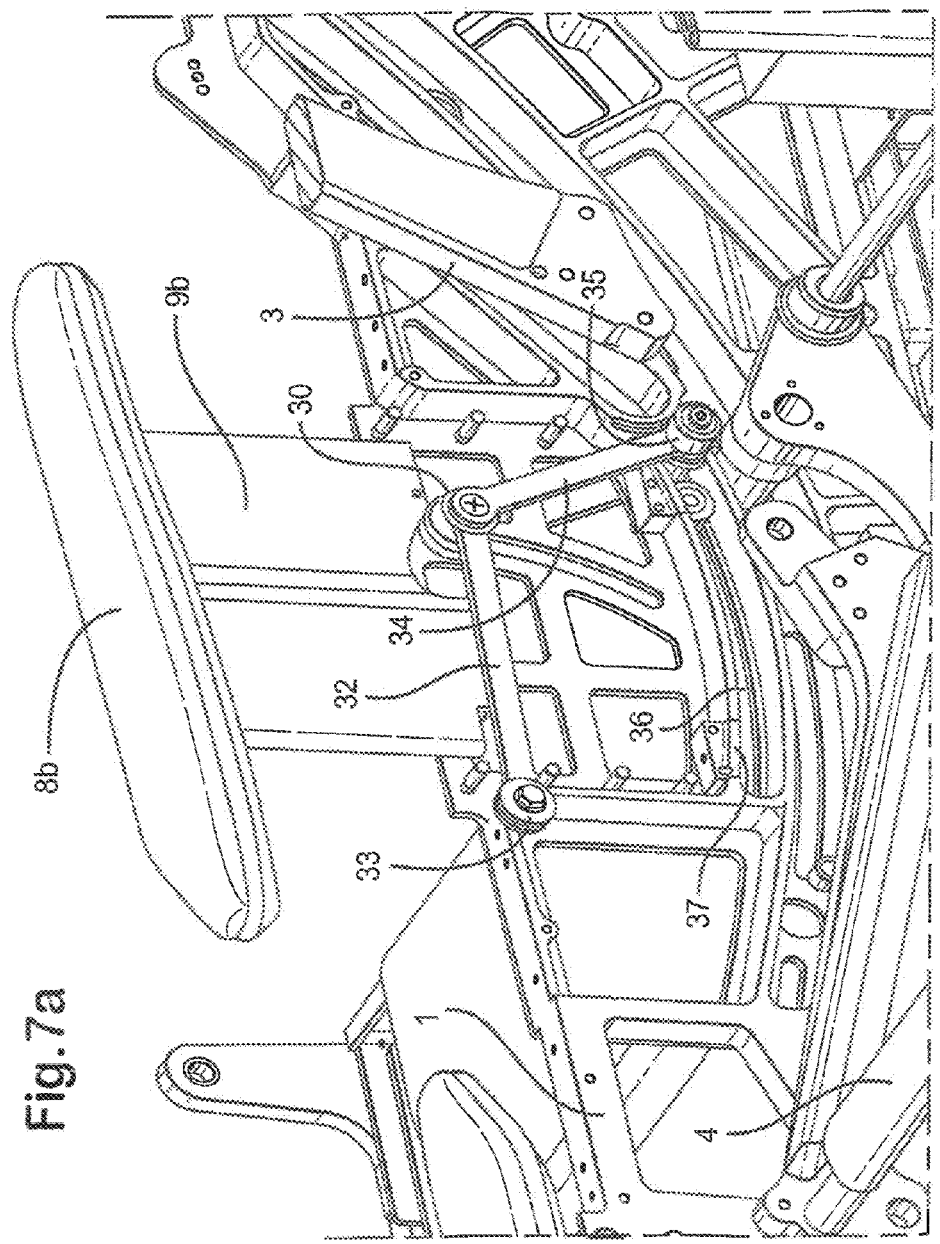

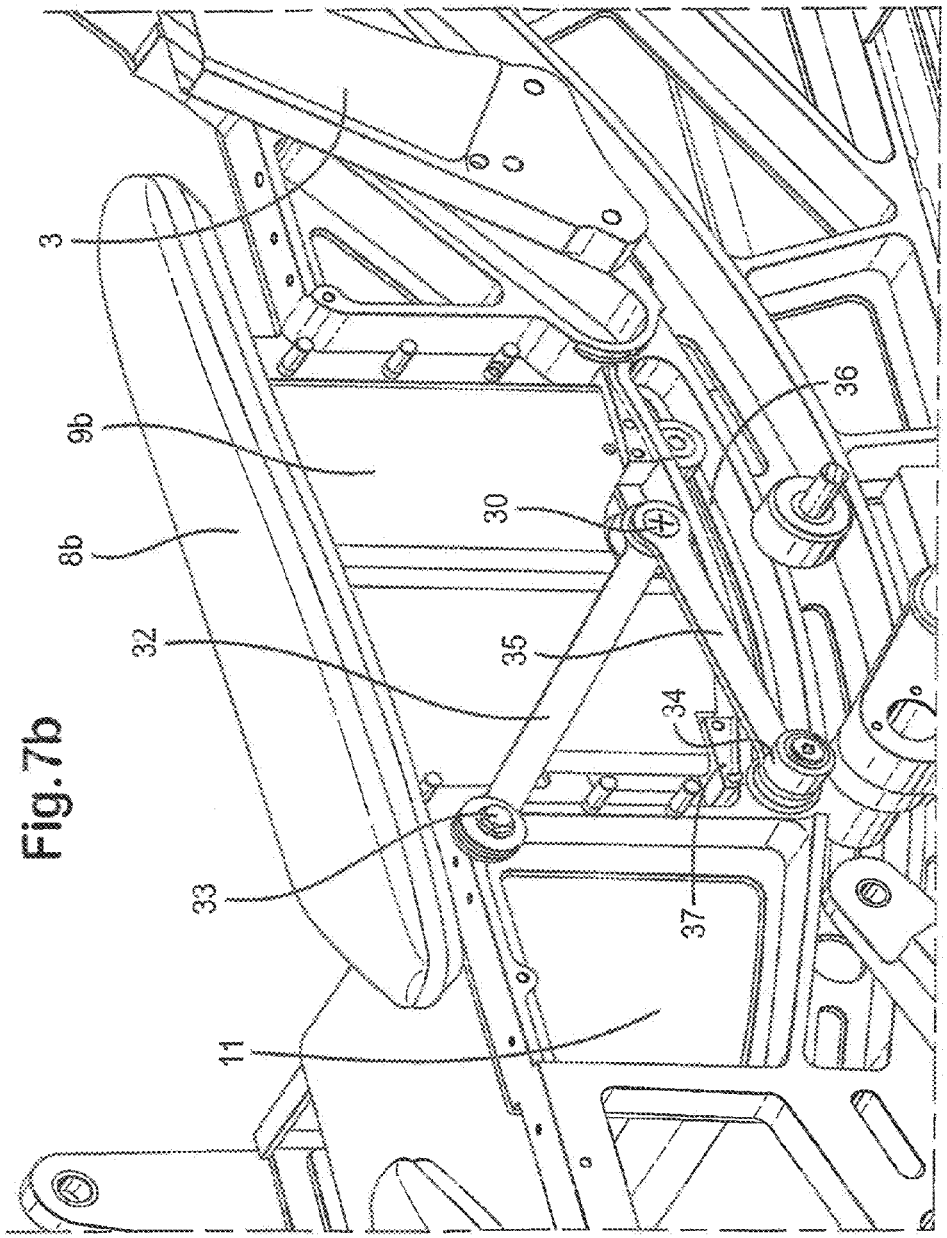

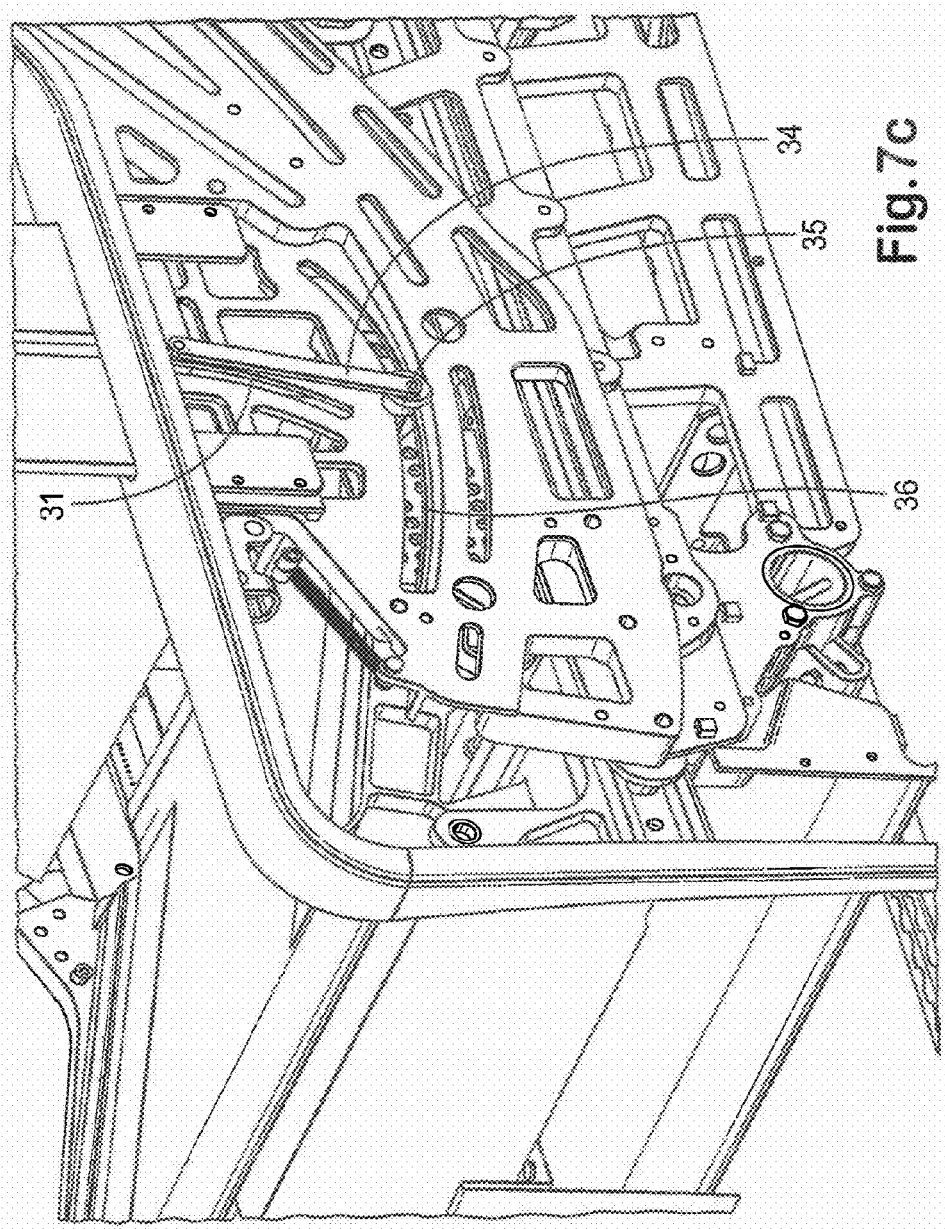

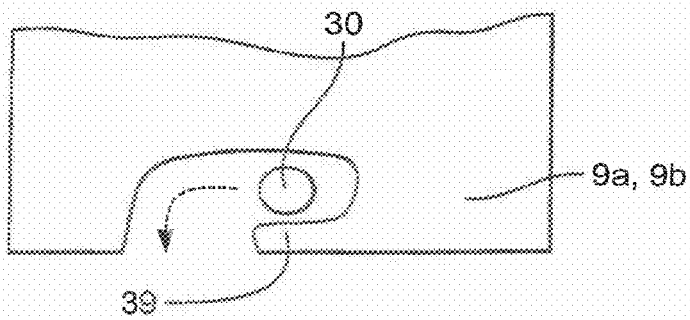
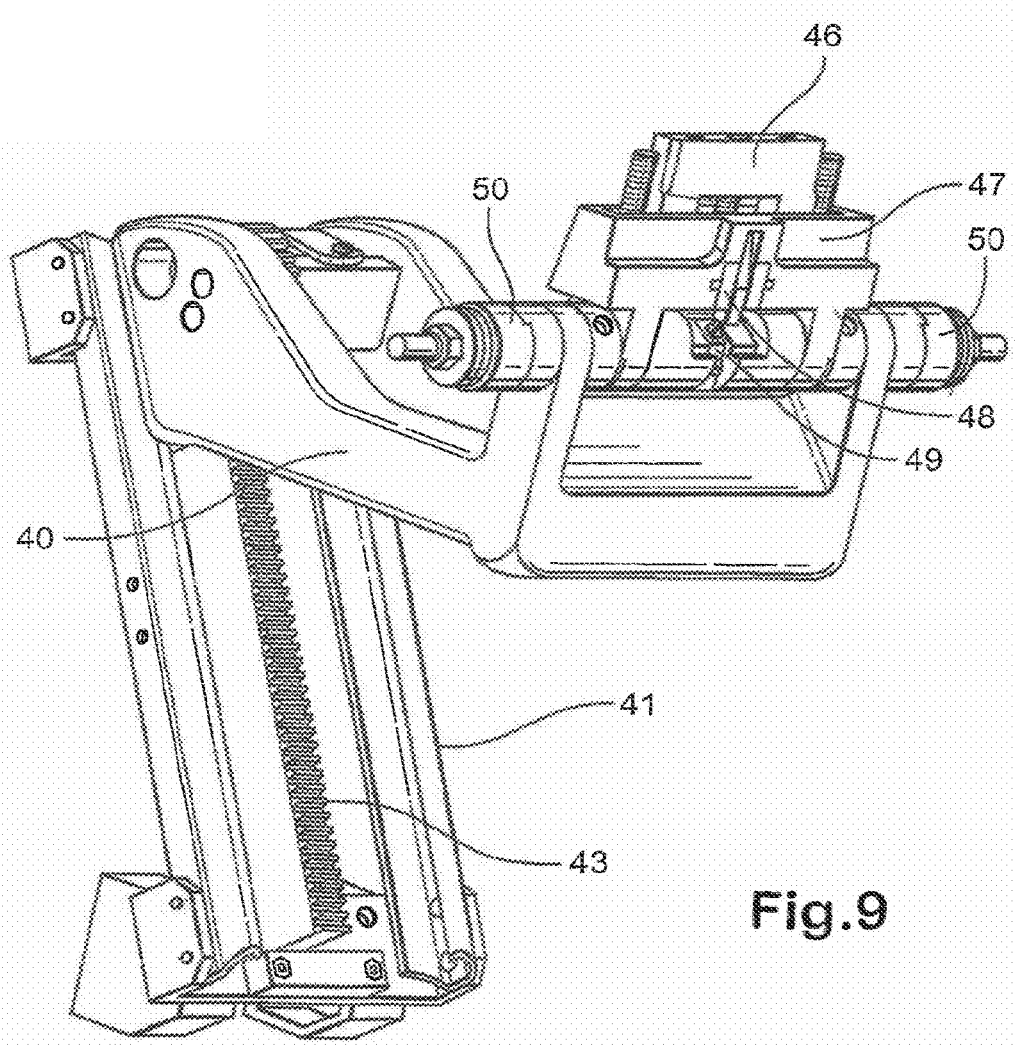

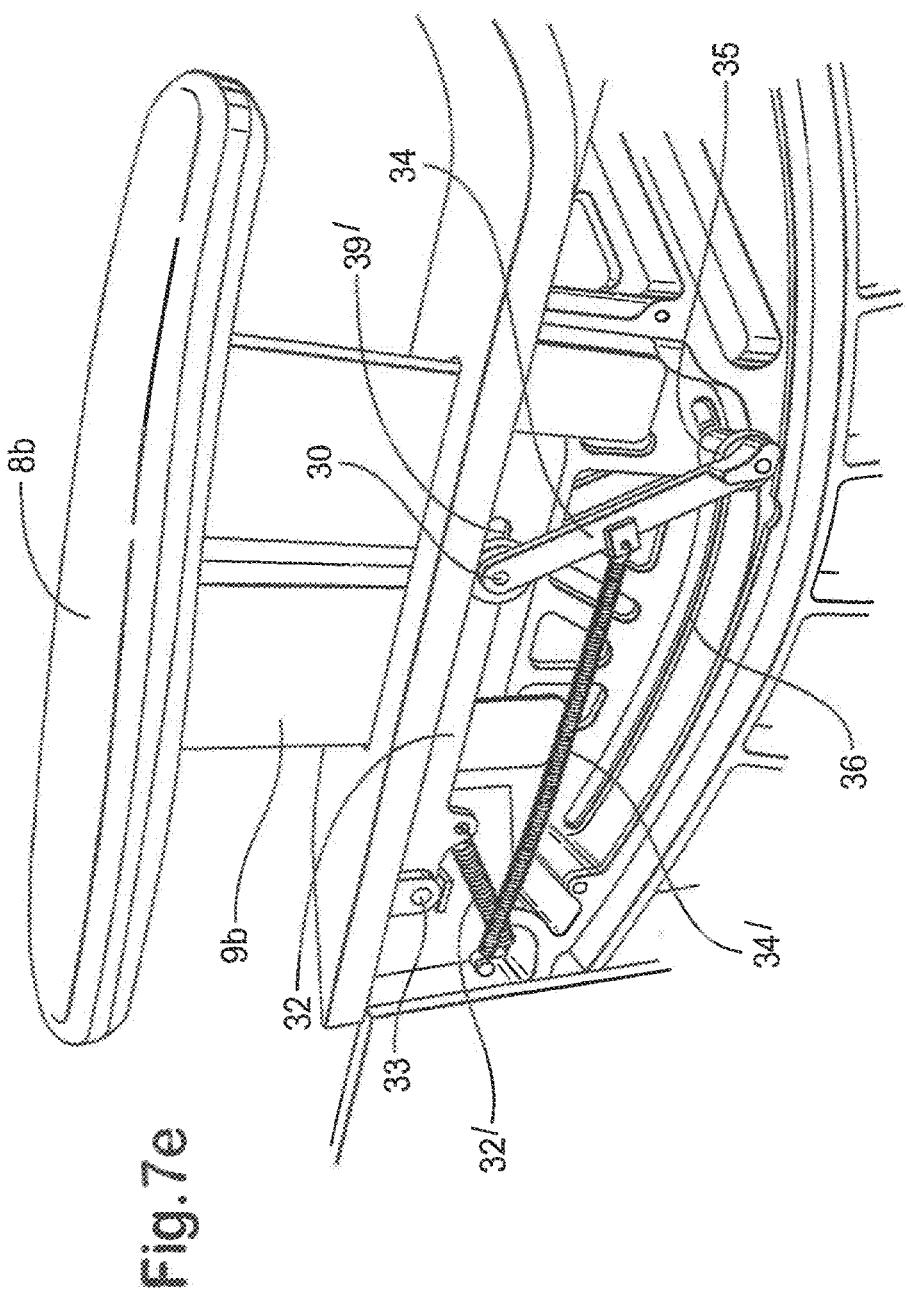

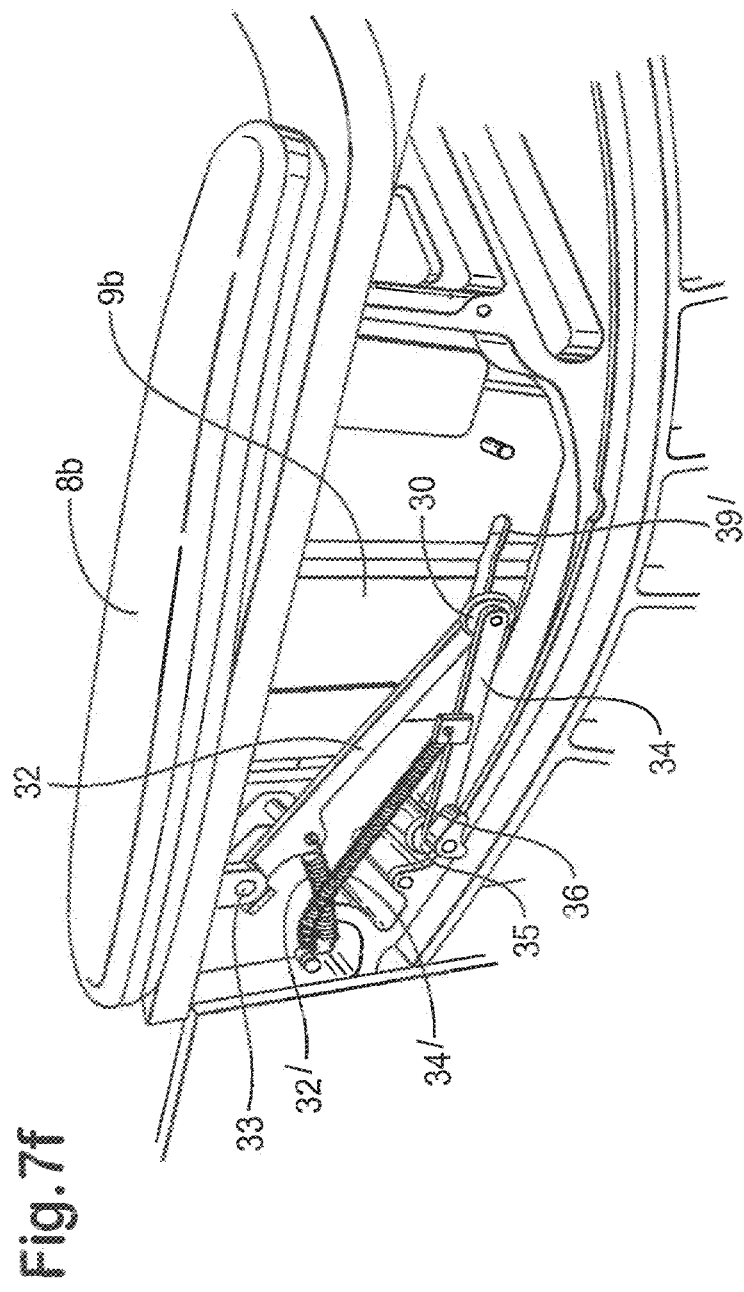

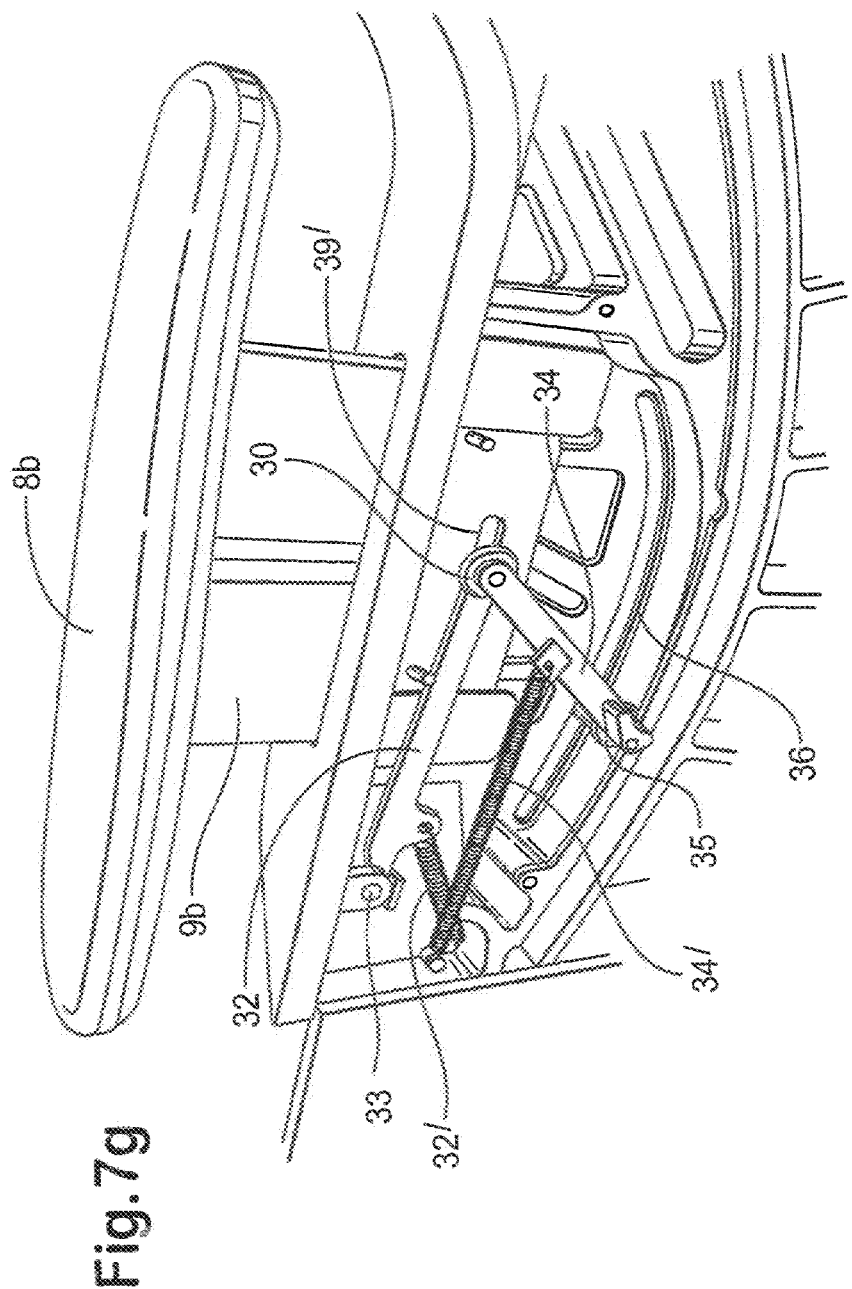

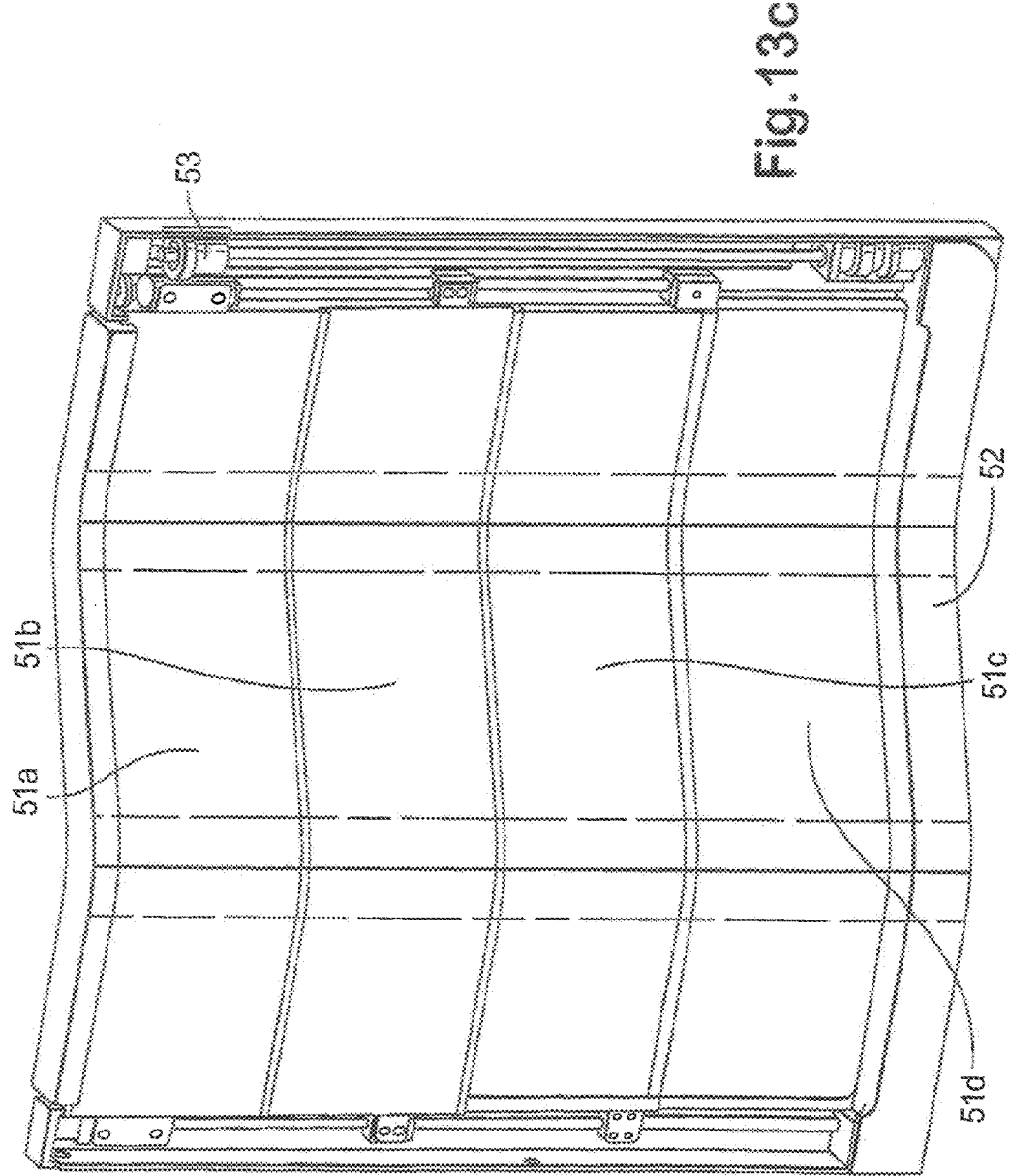

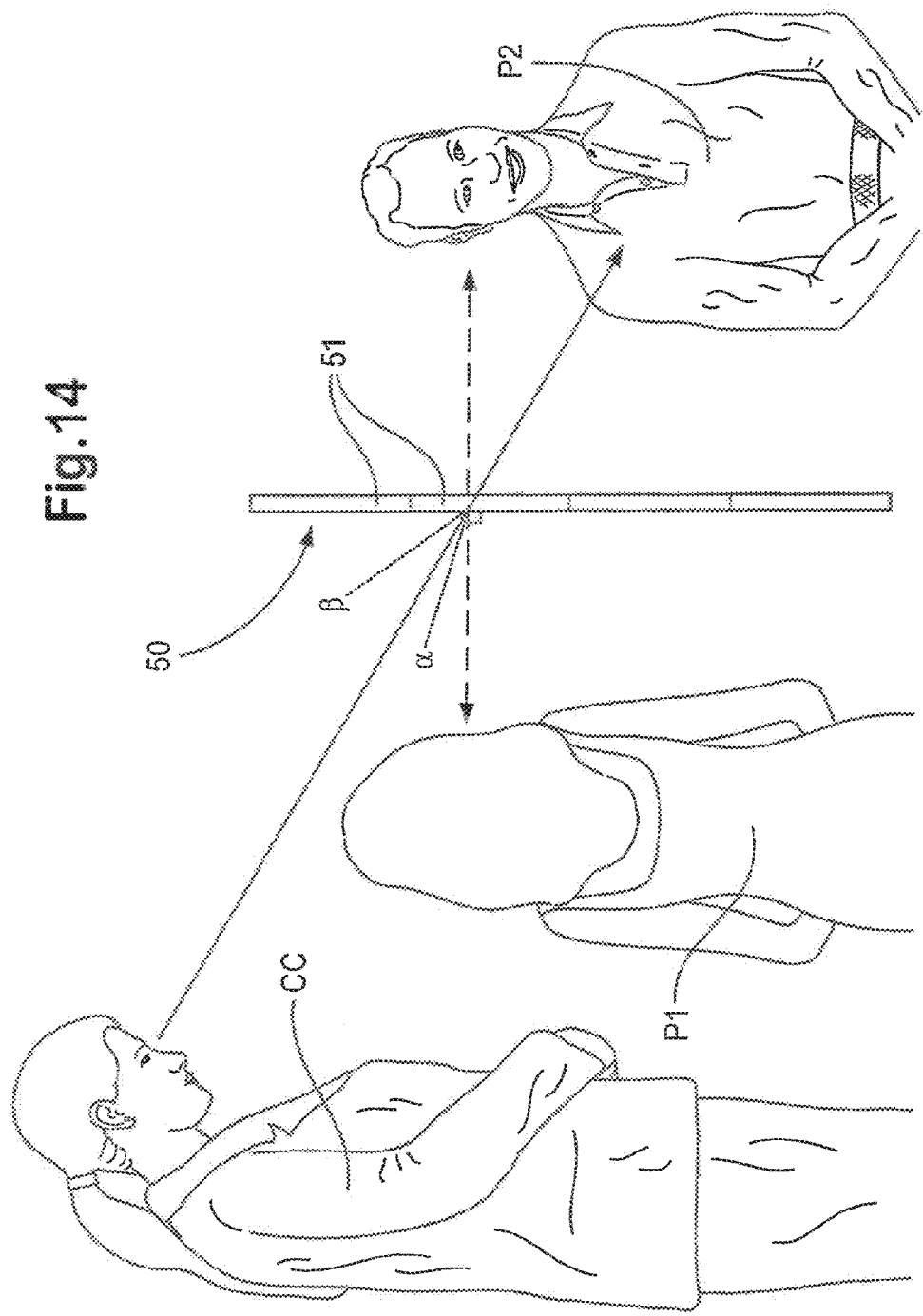

AIRCRAFT PASSENGER SEAT

CROSS REFERENCE TO RELATED APPLICATIONS

This application is a continuation of U.S. application Ser. No. 13/557,096, filed on Jul. 24, 2012, which is a continuation of U.S. application Ser. No. 12/158,637, filed on Feb. 23, 2009, abandoned, each of which is hereby incorporated by reference in its entirety.

BACKGROUND OF THE INVENTION

1. Field of the Invention

The present invention relates to an aircraft passenger seat, particularly but not exclusively to an aircraft sleeper seat convertible into a substantially flat bed.

2. Background Art

Examples of prior art aircraft sleeper seats are disclosed in the applicant's patent publications WO 96/18537 and WO00/21831, embodiments of which include the current British Airways First and Club World seats respectively. Both of these seats can be converted into a flat, horizontal bed, and have enjoyed great commercial success. However, there is intense competition to provide ever-greater comfort and space for aircraft passengers.

Passenger seats for aircraft are subject to stringent design constraints, many of which are not applicable to seats for other vehicle types. One problem is the need to meet the relevant safety standards for aircraft passenger seats, such as the 16 g test that requires seats to survive deceleration of 16 g in a takeoff/landing position. Another problem is the need to minimize the weight of the seat, since carrying extra weight on an aircraft increases fuel consumption and therefore monetary and environmental cost. Hence, the seat must be both strong and light.

Another problem relates to the use of space. Any given aircraft has a maximum area for passenger seating, which must be used in the most space-efficient manner possible so as to maximize the seating area and legroom available to each passenger, while allowing unimpeded exit from the seat. It is also important for cost reasons to fit as many passenger seats as possible in the available area.

Another problem relates to the level of comfort of the seat. Aircraft passenger seats may be used for day flights, in which the passenger will want to work, eat and/or relax, and night flights during which the passenger will want to sleep. Preferably, an aircraft passenger seat should be able to adopt comfortable positions for all of these activities, yet also be able to meet the relevant safety standards in a takeoff/landing position.

Another problem relates to the psychological and/or social needs of aircraft passengers, who may desire privacy while working, eating or sleeping, or may wish to interact with a travelling companion. There are also some arrangements that are undesirable for aesthetic and/or psychological reasons; for example, it is preferred that parts of the seat mechanism are not visible to the passenger.

Patent publication EP-A-1 116 654 (BE Aerospace) discloses an aircraft passenger sleeper seat that can adopt fully upright, semi-reclined or lounge and fully reclined or sleep positions. The seat includes an ottoman that functions as a foot or leg support, and has a top cushion and a pivoting legrest cushion.

U.S. Pat. No. 2,583,223 (Mayer) discloses a foot and leg rest for passenger vehicles, having a rearwardly inclined foot rest position and an elevated, forwardly inclined leg rest position.

Patent publication WO 98/36967 (Singapore Airlines) discloses an aircraft passenger seat with armrests that are lowered as the seat reclines, so as to lie flush with a seat portion in a fully reclined position and thereby improve the width available to the passenger.

U.S. Pat. No. 6,692,069 (Beroth et. al.) discloses an aircraft passenger sleeper seat in which an armrest pivots forwards as the seat reclines, so as to be aligned with a seat bottom in a fully reclined position and thereby improve the width available to the passenger. However, this arrangement does not allow the sleeping surface to be horizontal.

Statements of the Invention

According to a first aspect of the invention, there is provided an aircraft passenger seating arrangement comprising a primary seat having a seat pan and a seat back, and a secondary surface positionable opposite and separate from the primary seat, the passenger seating arrangement being able to adopt a first, substantially upright configuration in which the seat back is substantially vertical, a second, semi-reclined configuration in which the seat back is reclined between the horizontal and the vertical and a third, fully reclined configuration in which the seat back and seat pan are substantially horizontal, wherein in the second configuration the secondary surface is angled upwardly to support the lower leg(s) of the passenger and in the third configuration, the secondary surface is substantially horizontal and provides a substantially flat, continuous sleeping surface with the seat pan and the seat back.

An advantage of this seating arrangement is that configurations suitable for sitting upright, reclining and sleeping can be provided. Hence, the seating arrangement may be comfortable for long periods during day or night flights. In the second, semi-reclined position the lower leg(s) of the passenger may be fully supported, thereby providing a comfortable reclining position without the need for a footrest. Another advantage is that these configurations may be provided by means of only three support surfaces (the seat back, seat pan and secondary surface), allowing a simple mechanism for moving the support surfaces into the different configurations.

Preferably, in the first configuration, the secondary surface is substantially horizontal and is displaced both downwards and horizontally towards the primary seat, relative to the third configuration, so as to provide a footrest. An advantage of this arrangement is that the secondary surface is able to act both as a leg rest, in the second and third configurations, and as a foot rest, in the first configuration Preferably, the secondary surface is pivotable to a substantially vertical, stowed position. An advantage of this arrangement is that the second surface may provide minimal obstruction to a passenger leaving the primary seat. The secondary surface may be pivoted upwardly to the substantially vertical position, which is advantageous in that it allows a comparatively long secondary surface and a comparatively short mechanism for the secondary surface. Advantageously, the secondary surface may be stowed up against a housing, such as that of a seating arrangement of another passenger. Part of the mechanism of the secondary seat may be housed within that housing.

The secondary surface is considered to be independently inventive and therefore, according to a second aspect of the invention, there is provided a foot/legrest for an aircraft passenger seat, the foot/legrest having a support surface and a mechanism for securing the support surface in a first, substantially horizontal position and a second position at a substantial angle to the horizontal and vertical directions, for supporting the lower leg(s) of a passenger seated in the seat in a semi-reclined position, wherein the mechanism is arranged to rotate and translate the support surface between the first and second positions. The mechanism may include a pivot about which the support surface is rotatable, and means for translating the pivot. Preferably, the translating means is arranged to translate the pivot with a vertical component, and most preferably to translate the pivot in a direction at an angle substantially intermediate between the horizontal and vertical directions.

Preferably, the mechanism is also able to secure the support surface in a third, substantially horizontal position displaced in a vertical direction from the first position. Preferably, the third position is also displaced in a horizontal direction from the first position. An advantage of this arrangement is that the support surface may act as a leg rest for the passenger both in a semi-reclined and a sleeping position, while also acting as a foot rest for the passenger in an upright sitting position.

Preferably, the mechanism is operable to move the support surface to a substantially vertical, stowed position. An advantage of this arrangement is that the support surface then provides minimal obstruction to the passenger.

Preferably, the mechanism is arranged to secure the support surface such that the support surface is able to move downwardly if a force or torque greater than a predetermined threshold is applied downwardly to the support surface, and the support surface is able subsequently to return to its secured position; in other words, the mechanism gives way but is not damaged. An advantage of this arrangement is that, when stepped on or sat upon, the support surface at least partially moves out of the way of the passenger.

According to another aspect of the present invention, there is provided an aircraft passenger seat comprising a seat back, a seat pan and a frame, the seat being positionable in each of an upright configuration, a reclined configuration in which the seat back is reclined relative to the upright configuration and a substantially flat configuration in which the seat back and the seat pan form a substantially flat and continuous surface, wherein the seat back is guided so as to recline as the seat back moves forward relative to the frame, the seat back being connected to the seat pan by a pivotal connection between the seat back and the seat pan; and by a torque transmitting mechanism for governing the angle between the seat back and the seat pan as the seat back reclines. The seat back and/or the seat pan may be guided at least in part by engagement with the frame, for example by a pin guided along a track. The torque transmitting mechanism may comprise a cam mechanism separate from, and moveable relative to the frame.

According to another aspect of the present invention, there is provided an aircraft passenger seat comprising a seat back and a seat pan, the seat being positionable in each of an upright configuration and a substantially flat configuration in which the seat back and the seat pan form a substantially flat and continuous surface, the seat having a retractable armrest having a raised position in which the retractable armrest overhangs the seat pan in the upright configuration and a lowered position in which at least part of the armrest is located on or immediately above the seat back in the substantially flat configuration.

According to another aspect of the present invention, there is provided an aircraft passenger seat having a housing separating the seat from an adjacent aircraft passenger seat, the housing including a screen arranged to retract automatically in response to an electrical signal. The screen may be latched in a deployed position, and the latch released in response to the electrical signal. The screen may be latched by an electrical latch, and the electrical signal may comprise a reduction or removal of electrical power to the electrical latch.

According to another aspect of the present invention, there is provided an aircraft passenger seat having a screen between the seat and an adjacent aircraft passenger seat, the screen having a transparency dependent on vertical viewing angle, such that the screen is not transparent at a low vertical viewing angle but is transparent at a high vertical viewing angle.

BRIEF DESCRIPTION OF THE DRAWINGS

Embodiments of the invention will now be described with reference to the drawings identified below.

FIG. 1a is a perspective view of a seating arrangement in an embodiment of the invention, in a first configuration suitable for sitting substantially upright.

FIG. 1c is a perspective view of the seating arrangement in a third configuration, suitable for resting.

FIG. 1d is a perspective view of the seating arrangement in a fourth configuration, suitable for sleeping.

FIG. 2b is a schematic side view of the seating arrangement in the second configuration, suitable for takeoff and/or landing.

FIG. 2d is a schematic side view of the seating arrangement in the fourth configuration, suitable for sleeping.

FIG. 3a is a lateral cross-sectional view of a primary seat of the seating arrangement showing the configuration of armrests in a raised position.

FIG. 4a shows a detail of the reclining mechanism of FIG. 4 in the first configuration.

FIG. 4b shows a detail of the reclining mechanism of FIG. 4 in the second configuration.

FIG. 4c shows a detail of the reclining mechanism of Figure of 4 in the third configuration.

FIG. 4d shows a detail of the reclining mechanism of Figure of 4 in the fourth configuration.

FIG. 5 is a perspective view of the reclining mechanism.

FIG. 6b is a detailed view of the reclining mechanism in the second configuration.

FIG. 7a is a detailed view of a first embodiment of the armrest mechanism in the raised position.

FIG. 7b is a detailed view of the first embodiment of the armrest mechanism in the lowered position.

FIG. 7c is a detailed view of a second embodiment of the armrest mechanism.

FIG. 7d is a close-up view of the lower surface of the arrest support in the second embodiment.

FIG. 7e is a detailed view of a third embodiment of the armrest mechanism, in a raised position.

FIG. 7f is a detailed view of the third embodiment of the armrest mechanism, in a lowered position.

FIG. 7g is a detailed view of the third embodiment of the armrest mechanism, with the armrest lifted out of the lowered position.

FIG. 9 is a detailed perspective view of the support mechanism.

FIG. 13c show a securing mechanism of the privacy screen.

FIG. 14 is a diagram illustrating the dependence of the transparency of the privacy screen on vertical viewing angle.

DETAILED DESCRIPTION OF THE EMBODIMENTS

Seating Configurations

Figure 1B:
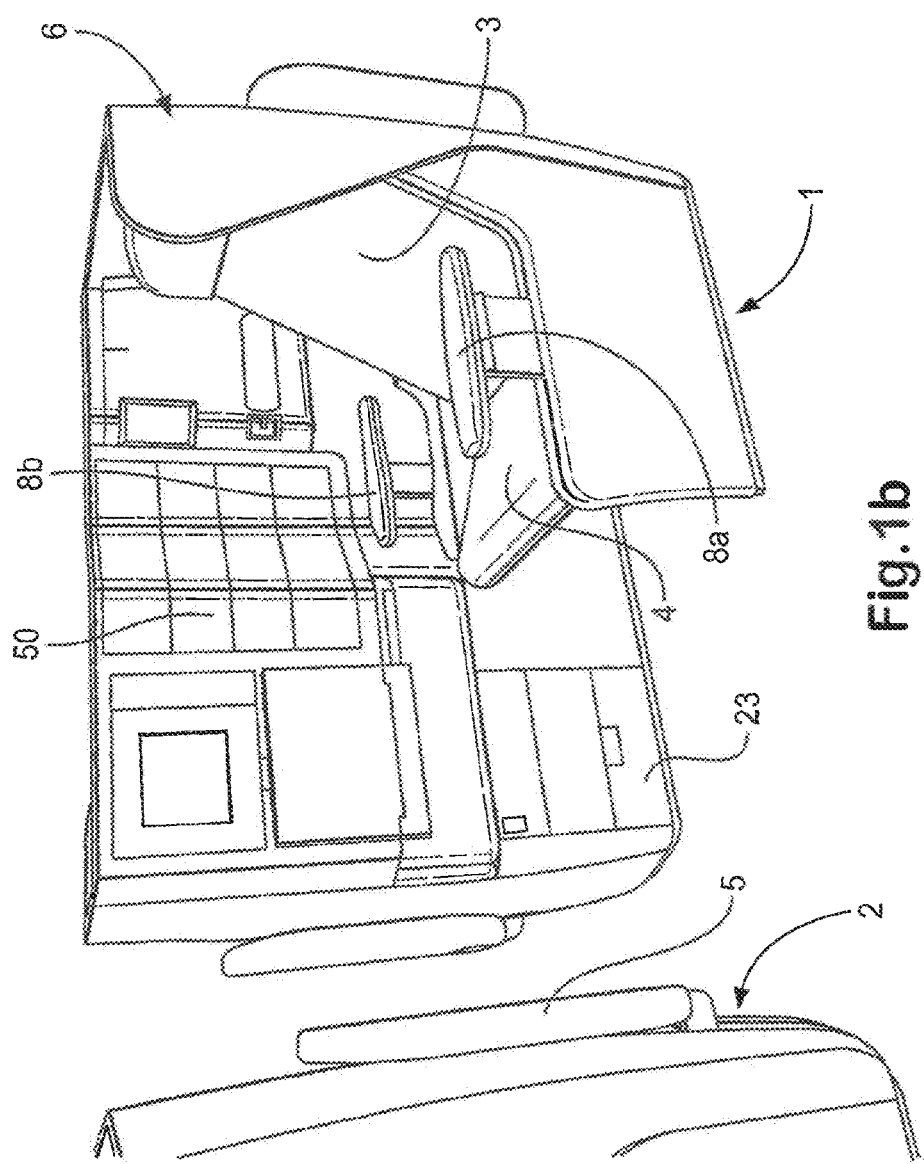
FIG. 1b is a perspective view of the seating arrangement in a second configuration, suitable for takeoff and/or landing.

In this section, 'horizontal' and 'vertical' are defined with reference to the floor of the passenger seating area of the aircraft. As in well-known in the art, the angle of the floor relative to the gravitational horizontal is determined by the pitch of the aircraft, which is about 15° during takeoff and landing, and about 3° in level flight. When discussing an individual seat, 'forward' and 'rearward' are defined with reference to the direction in which the passenger faces when seated.

FIGS. 1a to 1d show the same perspective view of a seating arrangement in an embodiment of the invention, in different configurations, while FIGS. 2a to 2d show the arrangement in schematic lateral view, in the respective configurations. The seating arrangement comprises a primary seat 1 and a secondary support 2 opposite the primary seat 1. The support surfaces of the primary seat 1 comprise a seat back 3 and a seat pan 4, while the support surface of the secondary support 2 comprises a foot/legrest 5. Left and right arm rests 8a, 8b are disposed either side of the seat pan 4.

The seat back 3 and the seat pan 4 are moveable together between upright, takeoff/landing, reclined and horizontal configurations by means of a seat reclining mechanism, embodiments of which will be described below. In the horizontal and reclined configurations, the arm rests 8a, 8b drop from a raised to a lowered position, under the control of the seat reclining mechanism.

The seat reclining mechanism is at least partially housed within a housing 6, so that it does not present a trap hazard to passengers, and is preferably not visible to passengers in normal use. The seat back 3 is substantially maintained within the housing 6 in each of the configurations, so that the seat back 3 does not impinge into space reserved for other passengers, and also does not present a trap hazard. The housing 6 partially surrounds the passenger, which affords a degree of privacy. A retractable privacy screen 50 is located in a side wall of the housing 6, separating the seat from an adjacent seat.

A storage drawer 23 is provided within the housing 6, located at floor level.

The secondary support 2 in this embodiment is configurable independently of the primary seat 1 and is not linked to the seat reclining mechanism. The secondary support 2 can be manually secured in different configurations, as described below.

Figure 2A:
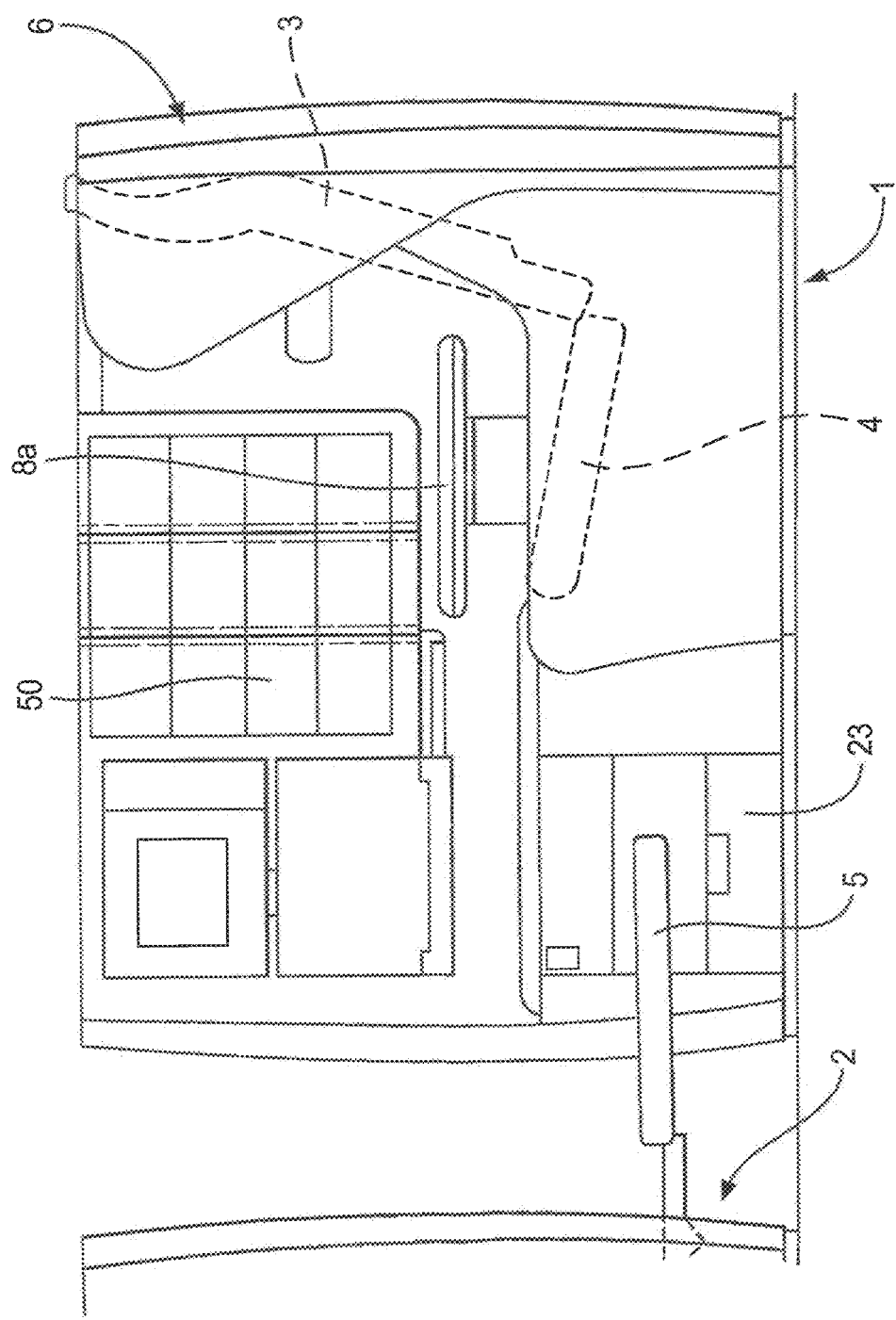
FIG. 2a is a schematic side view of a seating arrangement in an embodiment of the invention, in the first configuration suitable for sitting substantially upright.

In the first configuration as shown in FIGS. 1a and 2a, the seat back 3 is at its most upright position and the seat pan 4 is in its rearmost position. The arm rests 8a, 8b are in a raised position. The foot/legrest 5 is in a low, horizontal position, in which configuration it acts as a footrest. The first configuration is suitable for sitting upright, for example while the passenger is working or eating. The seat pan 4 is at about 10° to the horizontal, while the seat back 3 is between about 15-20° to the vertical.

In the second configuration as shown in FIGS. 1b and 2b, the seat back 3 is more reclined and the seat pan 4 has moved forward and is more inclined relative to its position in the first configuration. The angle of reclining of the seat back 3 is about 25-30° to the vertical and the angle of inclination of the seat pan 4 is about 15-20° to the horizontal. One advantage of this configuration is to avoid tipping the passenger out of the primary seat 1 during takeoff, where the primary seat 1 faces towards the rear of the aircraft. The primary seat 1 meets the required safety standards for takeoff and landing, such as the 16 g test, in the second configuration.

Figure 2C:
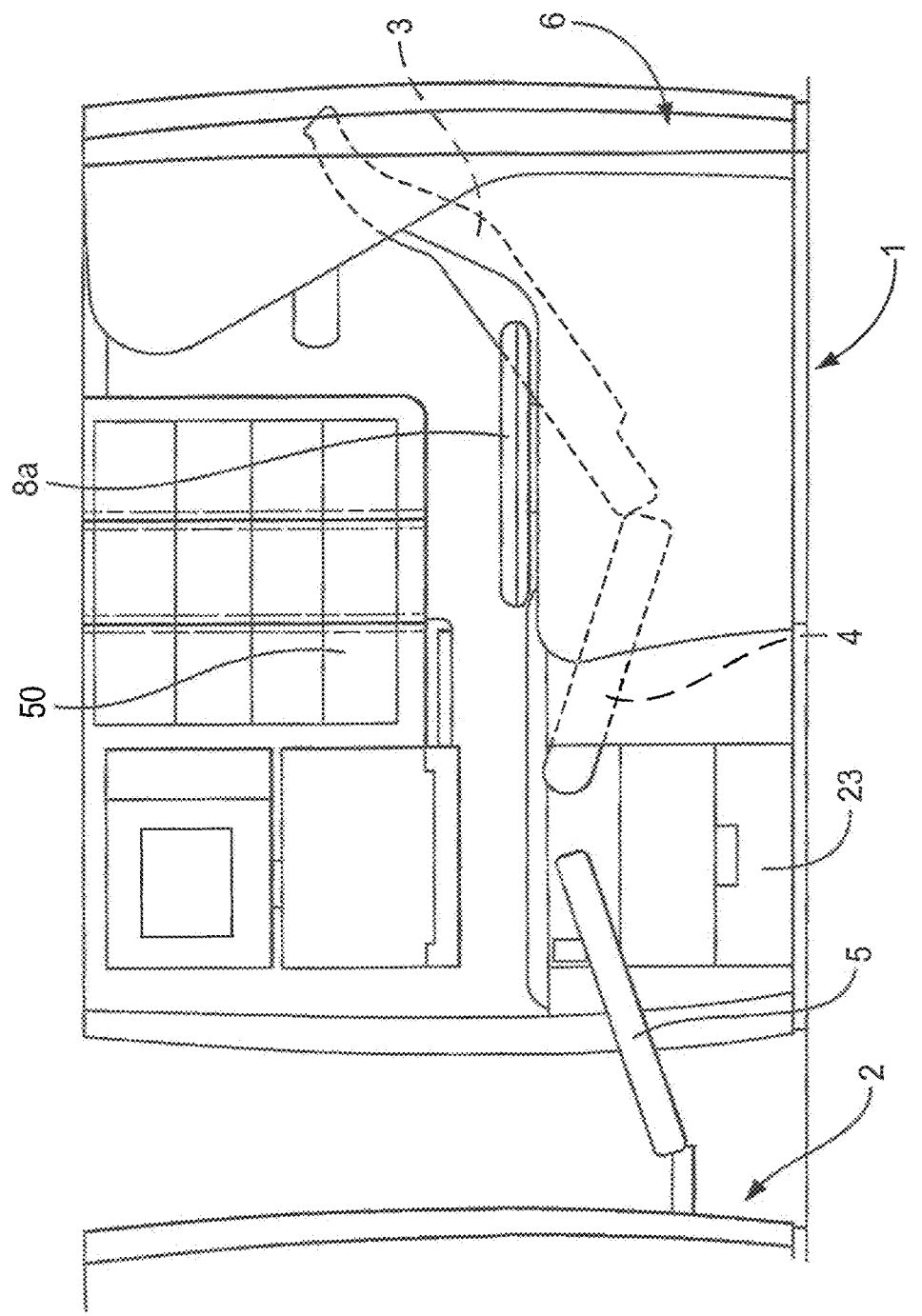
FIG. 2c is a schematic side view of the seating arrangement in the third configuration, suitable for resting.

In the third configuration as shown in FIGS. 1c and 2c, the seat back 3 is reclined by a large angle, such as 40-70°, to the vertical, and the seat pan 4 has moved forward relative to its position in the second configuration. Again, the angle of reclining of the seat back 3 and the corresponding forward movement of the seat pan 4 may be varied under control of the passenger, to provide the desired degree of reclining. The angle of the seat pan 4 remains substantially constant, about 17° to the horizontal. The arm rests 8a, 8b have dropped into the lowered position. The third configuration is suitable for resting and/or in-flight entertainment. The foot/legrest 5 may be configured as shown in an angled position, sloping upwards in the rearward direction by about 15° to the horizontal, so as to support the lower leg(s) of the passenger. In this way, the passenger is supported in a reclined sitting position, with weight distributed across the seat back 3, seat pan 4 and foot/legrest 5. This configuration corresponds to the position that the relaxed human body adopts in a weightless environment, and is very comfortable. Moreover, passengers who are accustomed to sleeping on their back may find this configuration suitable for sleeping. As a result of the Z-shaped configuration of the seat back 3, seat pan 4 and foot/legrest 5, the overall length that can be supported in the third configuration is greater than that supported in the fourth, flat and horizontal configuration, so that unusually tall passengers may also find the third configuration suitable for sleeping. In one specific embodiment, the overall length supported in the third configuration is 198 cm (78 inches), while an overall length of 183 cm (72 inches) is supported in the fourth configuration.

In the fourth configuration as shown in FIGS. 1d and 2d, the seat back 3 and the seat pan 4 are substantially horizontal and form a substantially continuous, flat surface. The arm rests 8a, 8b are lowered, and rest adjacent to the seat back 3. The foot/legrest 5 may be configured as shown in a high horizontal position, raised and moved forwardly relative to the second configuration. In this position, the foot/legrest 5 forms a substantially flat, continuous surface with the seat back 3 and the seat pan 4. The fourth configuration is suitable for sleeping, and preferably provides sufficient width to allow passengers to sleep on their sides, back or front.

Arm Rests

The configuration of the arm rests 8a, 8b enhances the width available to the passenger both when sitting, in the first and second configurations, and resting, as in the third and fourth configurations. The configuration of the arm rests 8a, 8b in the raised position is shown in lateral cross-section in FIG. 3a. The armrests 8a, 8b are supported on relatively thin, elongate movable armrest supports 9a, 9b that project from the housing 6. At least the inner edges of the armrests 8a, 8b project inwardly so as to overhang the seat pan 4. This arrangement provides a width W1 for the passenger's hips under the armrests 8a, 8b greater than the distance D between the armrests 8a, 8b.

Figure 3B:
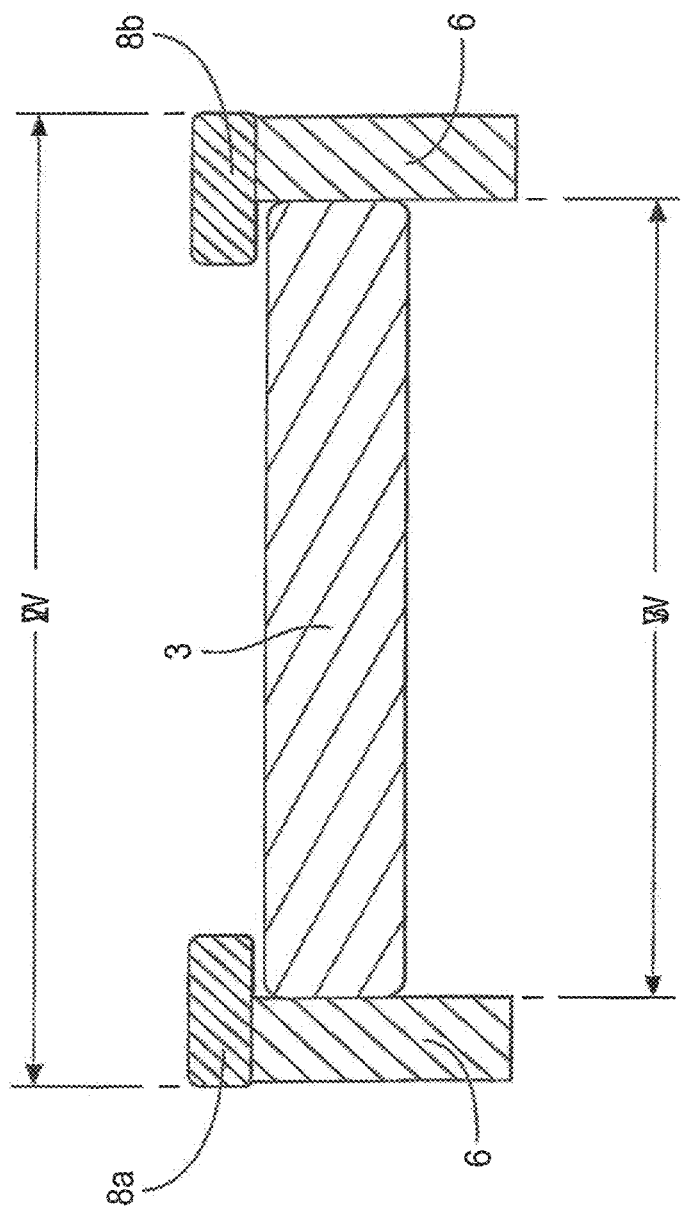
FIG. 3b is a corresponding lateral cross-sectional view showing the configuration of armrests in a lowered position.

The configuration of the arm rests 8a, 8b in the lowered position is shown in lateral cross-section in FIG. 3b. The armrest supports 9a, 9b have retracted into the housing 6 and the armrests 8a, 8a partially rest on or just above the seat back 3. The upper surfaces of the arm rests 8a, 8a are not coplanar with the upper surface of the seat back 3, but are nevertheless sufficiently adjacent to allow part of the passenger's body, such as the elbow or shoulder, to rest comfortably on the arm rests 8a, 8b when the passenger is resting. Thus, the width of the armrests 8a, 8b forms part of the available width W2 of the sleeping surface. In a specific embodiment, in which the width W3 of the seat back 3 and seat pan 4 is 53 cm (21 inches), the width W2 of the sleeping surface at the shoulder position of a passenger is 66 cm (26 inches).

Primary Seat Mechanism

Figure 4:
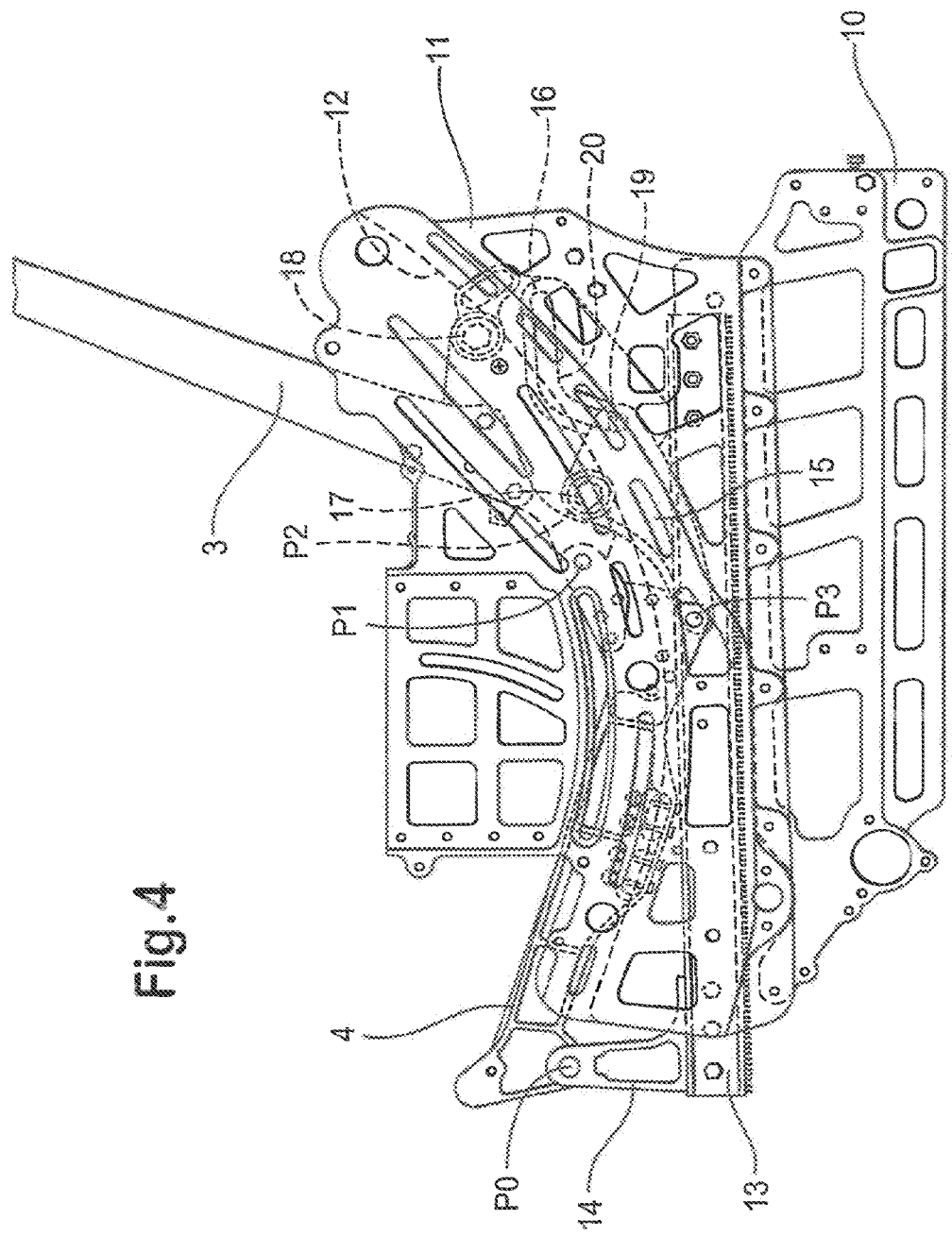
FIG. 4 is a side view of a reclining mechanism for the primary seat.
Figure 6A:
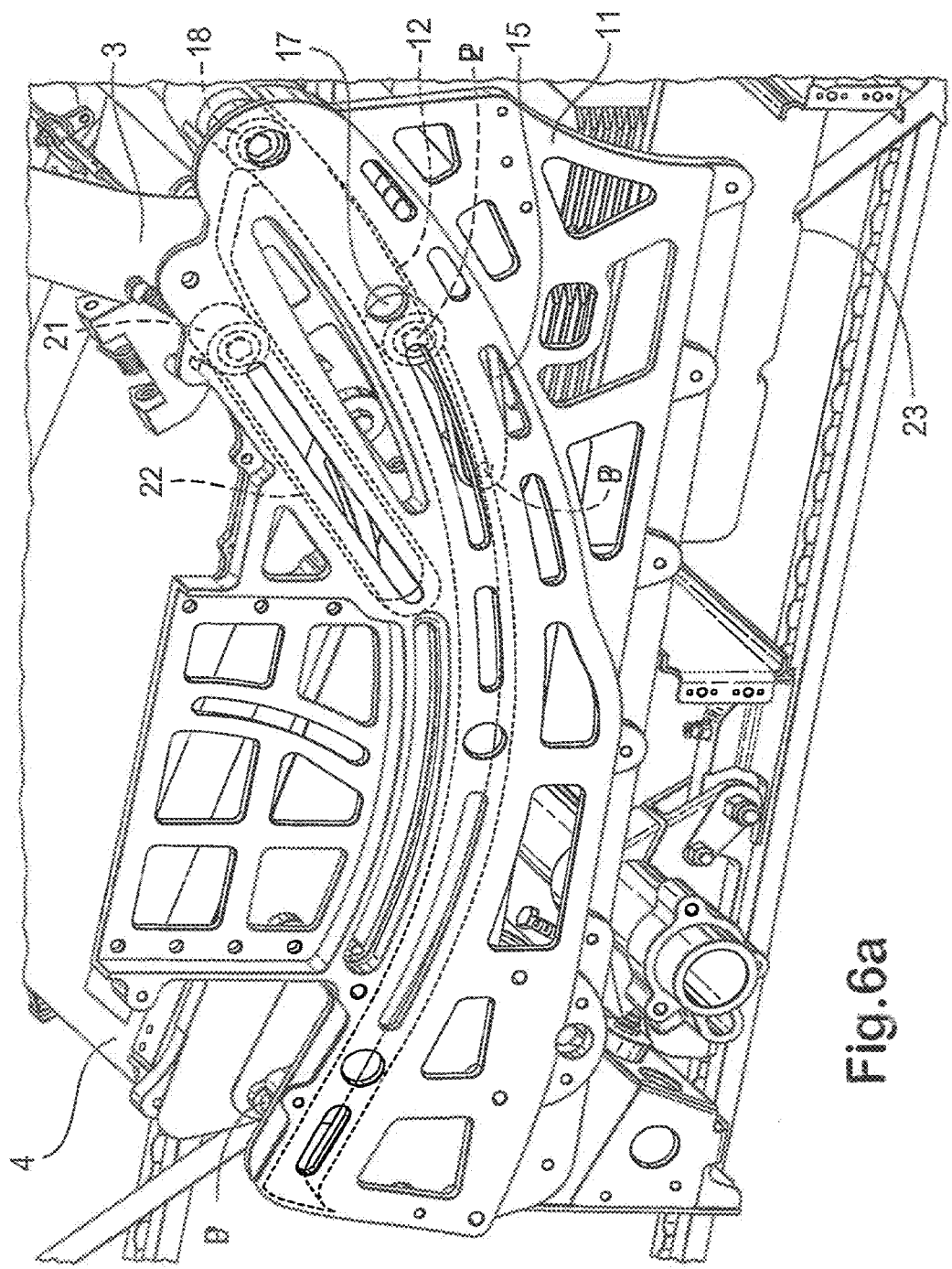
FIG. 6a is a detailed view of the reclining mechanism in the first configuration.
Figure 6C:
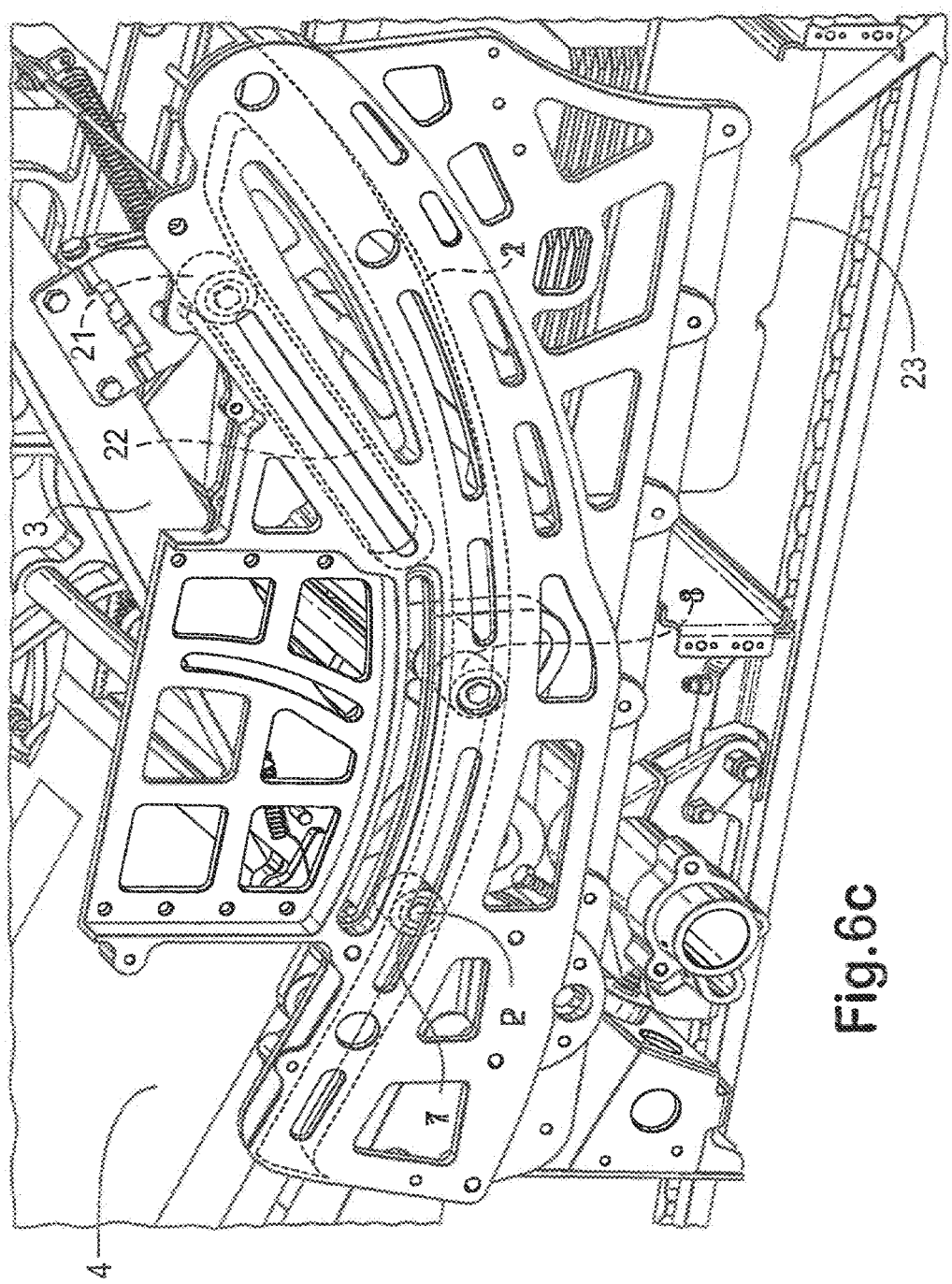
FIG. 6c is a detailed view of the reclining mechanism in the third configuration.
Figure 6D:
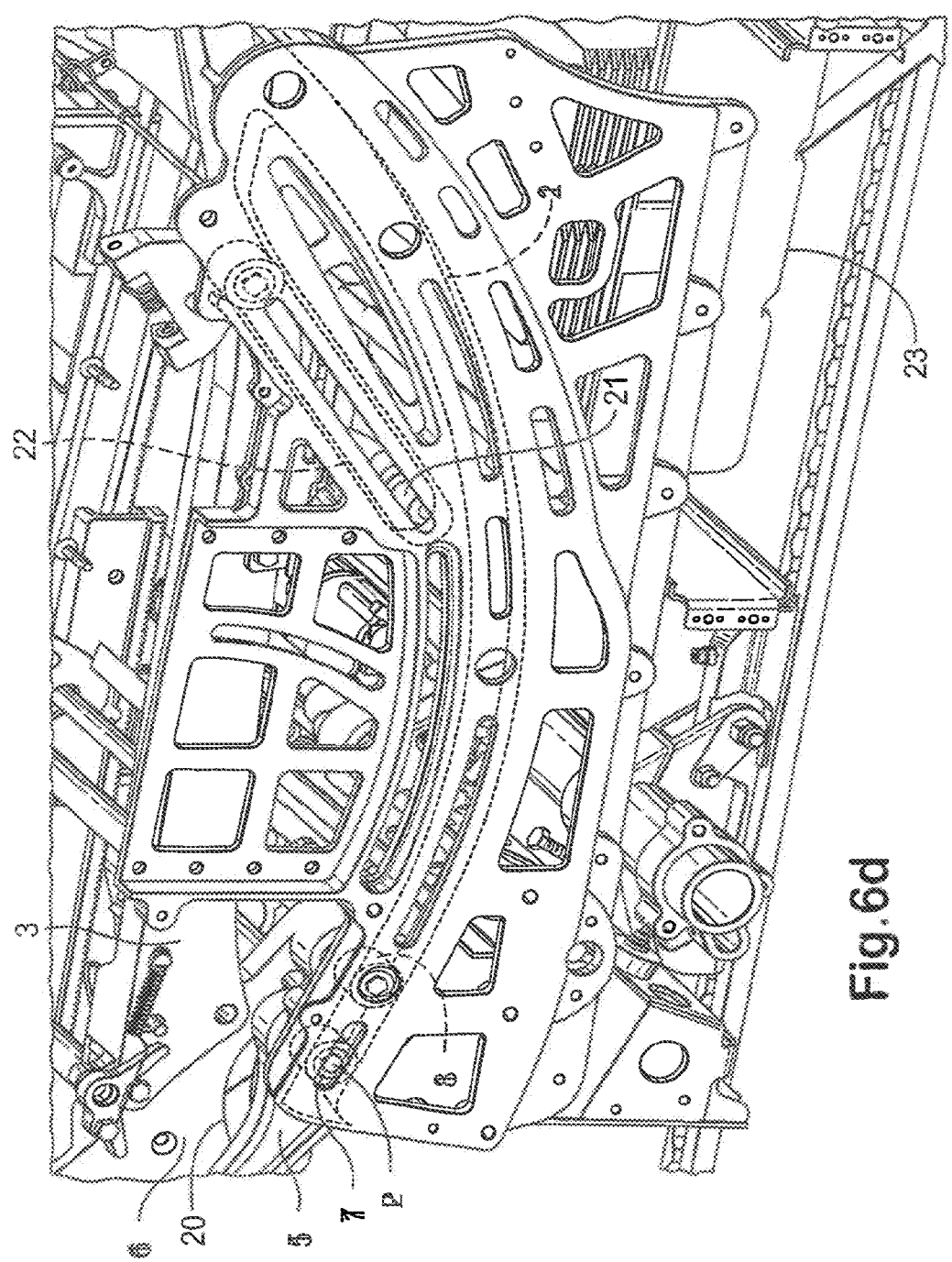
FIG. 6d is a detailed view of the reclining mechanism in the fourth configuration.

As described above, the mechanism for reclining the primary seat 1 is required to move the seat back 3 and the seat pan 4 through a complex path as they pass from the first to the fourth configuration. In particular, the seat pan 4 is required to move from a slightly rearwardly inclined position (i.e. with the forward end higher than the rearward end) in the first configuration, to a more rearwardly inclined position in the second and third configurations, to a horizontal position in the fourth configuration. In other words, the seat pan 4 first increases and then decreases its inclination as the seat back 3 reclines. The top of the seat back 3 moves substantially vertically downwards as the seat back 3 reclines, while the bottom of the seat back 3 moves forwards and remains adjacent to the rearward end of the seat pan 4. These requirements must be met with the least possible weight and the sufficient strength to pass the relevant safety standards. A mechanism suitable for meeting these requirements will now be disclosed with reference to FIGS. 4, 4a and 5 show respectively side and perspective views of the principal parts of the support and reclining mechanism of the primary seat 1. A lower frame 10 is arranged to be fixed to the floor of the passenger compartment by a suitable fixing arrangement. An upper frame 11, fixed to the lower frame 10, includes an arcuate guide track 12. The seat back 3 and seat pan 4 are supported on a carriage comprising a drive rail 13, a seat pan support 14, the seat pan 4, the seat back 3, and a linkage between the seat back 3 and the seat pan comprising a torque member 15 and a cam 16.

The drive rail 13 is reciprocally drivable in the horizontal direction by a motor and drive train (not shown). For example, the underside of the drive rail 13 may comprise a rack driven by a pinion mounted on the upper frame 11. The seat pan support 14 is mounted on the forward end of the drive rail 13, and is pivotally connected to the forward end of the seat pan 4 at pivot P0.

The seat back 3 includes a forward roller 17 and a rearward roller 18, which are arranged to move along the guide track 12 while supporting the seat back 3, thus controlling the inclination of the seat back 3 as it reclines and the rollers 17, 18 move forwards along the guide track 12.

The seat back 3 is pivotally connected to the seat pan 4 at first pivot P1, and via the torque member 15 which is connected to the seat back 3 at second pivot P2, coaxial with the forward roller 17, and at third pivot P3 under the rearward end of the seat pan 4. Note that the third pivot P3 and connecting parts of the torque member 15 and seat pan 4 are concealed behind the drive rail 13 in FIG. 4, but are shown in dotted outline in FIG. 4a.

The rotation of the torque member 15 is governed by a pin 19 located within a cam track 20 within the cam 16. As the seat back 3 reclines between the second and third configurations, the pin 19 travels along the cam track 20 and the inclination of the seat pan 4 remains substantially constant. As the seat back 3 approaches the fourth, horizontal configuration, the pin 19 reaches the end of the cam track 20 and the torque member 15 rotates clockwise, lifting the rearward end of the seat pan 4 up so that the seat pan 4 assumes the horizontal position.

In the embodiment shown in FIGS. 6a to 6d, the seat back 3 includes a support roller 21 that enters an open-ended support track 22 in the upper frame 11 as the seat back 3 approaches the horizontal configuration, so as to provide an additional support point for the seat back 3 in the horizontal position. Note that in FIGS. 6a to 6d, some parts of the mechanism are not shown so that the underlying mechanism can be seen.

Also shown is the drawer 23 for the adjacent seat, that fits under the reclining mechanism. As is apparent from FIG. 4, no part of the reclining mechanism extends below the upper frame 11. Thus, the drawer 23 does not obstruct the seat pan 4 or reclining mechanism, and can be left pulled out when the seat is reclined.

Armrest Mechanism

First Embodiment

FIGS. 7a and 7b show a first embodiment of the armrest mechanism in the raised and lowered positions respectively. In the raised position, the lower surface of the armrest support 9a, 9b rests on a pin 30, moveable reciprocally along a substantially vertical arcuate track 31 in the upper frame 11 and connected by a first linkage 32 to a fixed first pivot 33 located on the upper frame 11 forward of the armrest support 9a, 9b, and connected by a second linkage 34 to a second pivot 35 moveable reciprocally along a substantially horizontal arcuate track 36 in the upper frame 11. As the second pivot 35 moves forward along the horizontal arcuate track 36 from the position shown in FIG. 7a to that shown in FIG.

7b, the pin 30 falls along the substantially vertical arcuate track 31 as the first and second linkages 32, 34 rotate clockwise, and the armrest support 9a, 9b falls under gravity, following the pin 30, until the armrest support 9a, 9b comes to rest on stops 37. The lower surface of the armrest support 9a, 9b includes a recessed portion, such that the pin 30 does not contact the lower surface in the lowered position.

The second pivot 35 is preferably connected so as to move with the primary seat reclining mechanism, such that the second pivot 35 moves forward as the primary seat 1 reclines. The second pivot may engage primary seat reclining mechanism, or may be biased so as to abut against part of the seat reclining mechanism. This has the effect of lowering the armrests 8a, 8b as the primary seat 1 moves into the third configuration, as described above. An advantage of the armrest mechanism is that the armrests 8a, 8b are not driven into the lowered position, but fall as the pin 30 falls. Therefore, any object trapped under the armrests 8a, 8b as they fall will be subjected only to the weight of the armrests 8a, 8b and armrest supports 9a, 9b, and not to the driving force of the armrest mechanism. The object can easily be released by manually lifting the relevant armrest 8a, 8b, without applying force to the armrest mechanism. In other words, the armrest support 9a, 9b is biased against, but not engaged by the armrest mechanism. This bias may be entirely due to the weight of the armrest support 9a, 9b and armrest 8a, 8b, or may be enhanced by biasing means such as a spring.

Armrest Mechanism

Second Embodiment

A second embodiment of the armrest mechanism is shown in FIGS. 7c and 7d. Similar parts to the first embodiment carry the same reference numerals. In this embodiment, the first linkage 32 is not present, and the armrest mechanism has a single linkage 34, the lower end of which comprises the pivot 35 moveable reciprocally along the substantially horizontal arcuate track 36 in the upper frame 11. The upper end of the single linkage 34 comprises the pin 30 which is moveable along the substantially vertical arcuate track 31.

As the seat is moved into an upright position, a lifter blade 38 fixed to the drive rail 13 abuts the pivot 35 and pushes it rearwardly along the substantially horizontal arcuate track 36 so that the pin 30 rises in the substantially vertical arcuate track 31 and pushes the lower surface of the armrest support 9a, 9b into the raised position. As the seat reclines, the pivot 35 is biased against the lifter blade 38 and moves forwards with the lifter blade 38, so that the armrest moves to the lowered position. The bias may be gravitational (due to the weight of the armrest mechanism) or may be achieved by a spring or other biasing means.

In the second embodiment, the lower surface of the armrest support 9a, 9b has a re-entrant form as shown in FIG. 7d. A hook-shaped portion 39 engages the pin 30 when the armrest is in the raised position. As the pin 30 moves downwardly and forwardly in the substantially vertical (but slightly forwardly inclined) arcuate track 31, it moves out of engagement with the hook-shaped portion 39. As a result, the armrest is driven by the armrest mechanism at an initial lowering stage. This has the advantage of preventing the armrest support 9a, 9b from sticking in the raised position. However, the armrest falls under gravity during a final lowering stage as in the first embodiment, thus avoiding trapping objects under the armrest.

Armrest Mechanism

Third Embodiment

FIGS. 7e and 7f show a third embodiment of the armrest mechanism in the raised and lowered positions respectively. Similar parts to the first and second embodiments carry the same reference numerals and their description will not be repeated except where necessary.

In common with the first embodiment, the armrest mechanism of the third embodiment comprises first and second linkages 32, 34, rather than the single linkage 34 of the second embodiment. The first and second linkages 32, 34 are biased towards a collapsed position as shown in FIG. 7f, whereby the armrest support 9b is biased into the lowered position. In this example, the bias is applied by springs 32', 34' connected between the upper frame 11 and the first and second linkages 32, 34 respectively.

The armrest mechanism is moved from the lowered position to the raised position of FIG. 7a by lifter blade 38 (not shown) similar to that of the second embodiment, which abuts the second pivot 35 and moves it along the horizontal arcuate track 36, thus raising the pin 30 and the armrest support 9b.

Unlike in the first embodiment, the pin 30 is enclosed within an elongate track or slot 39' in an end portion of the armrest support 9b. Like the hook-shaped portion 39 of the second embodiment, the slot 39' allows the pin 30 to reciprocate horizontally as the pin 30 moves up and down the substantially vertical arcuate track 31. However, the slot 39' does not allow the armrest support 9b to be lifted away from the pin 30 when the armrest mechanism is in its lowered position. Instead, as shown in FIG. 7g, lifting the armrest 9b causes the armrest mechanism to move out of the collapsed configuration of FIG. 7f, against the bias. The second pivot 35 moves along the horizontal arcuate track 36, out of abutment with the lifter blade 38.

In this way, the armrest 8b can be lifted to free an object trapped underneath. The trapping force is only that caused by the bias of the armrest mechanism and by the weight of the armrest, rather than the force of the seat reclining mechanism, because the armrest mechanism is biased against the seat reclining mechanism but is not engaged by it.

Secondary Support Mechanism

The secondary support 2 is required to adopt the following positions:

i) Vertically stowed, to minimize obstruction to the passenger when leaving the primary seat 1, or during takeoff or landing;
ii) Low horizontal, positioned rearward so as to act as a footstool when the primary seat is in the first configuration;
iii) Angled upwardly, with the end towards the primary seat raised, so as to act as a legrest when the primary seat 1 is in the third configuration; and
iv) High horizontal, positioned forward so as the form part of a flat, horizontal bed in alignment with the primary seat 1 in the fourth configuration.

Figure 8:
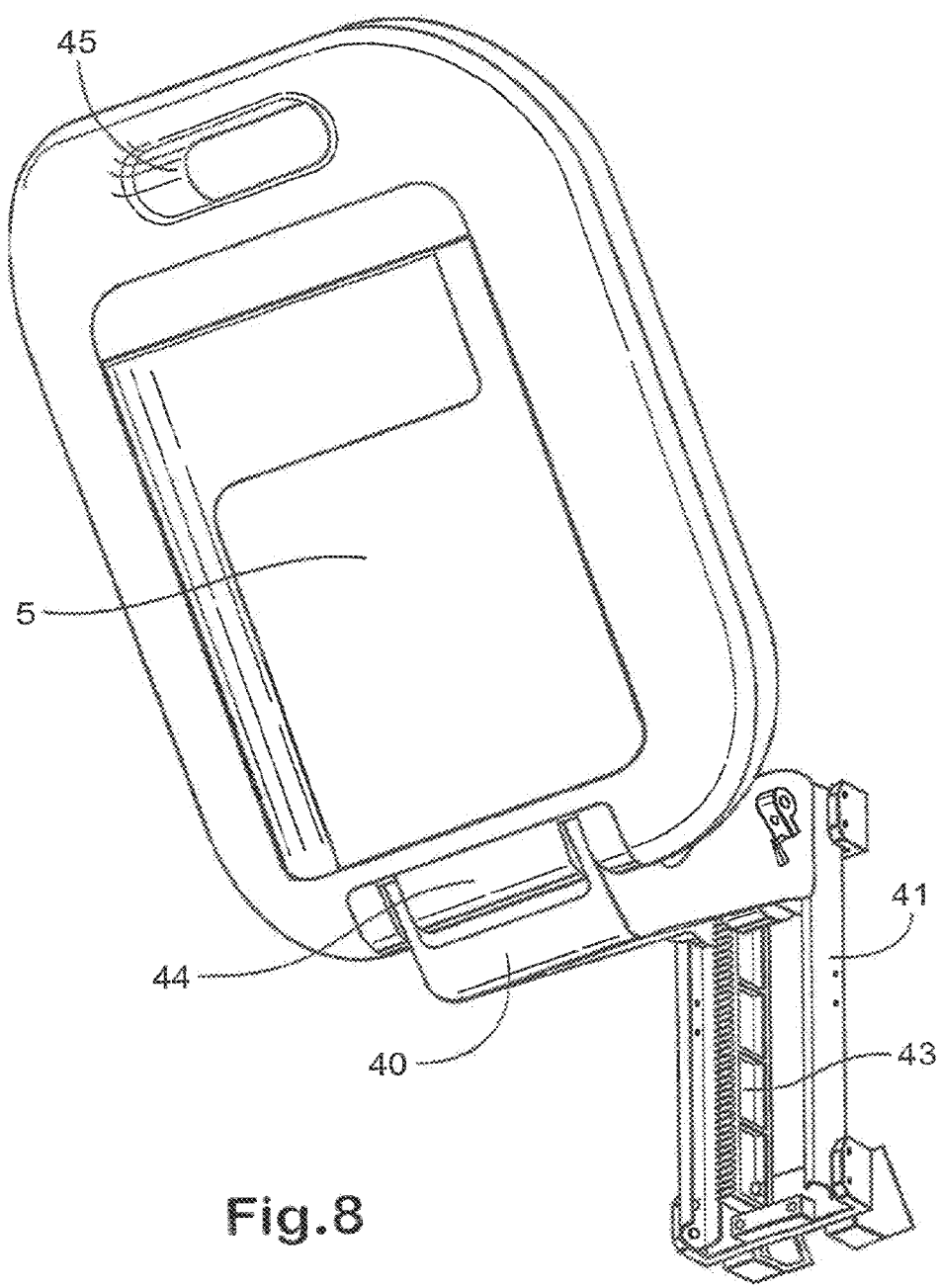
FIG. 8 is a perspective view of the support mechanism of the secondary support.
Figure 10:
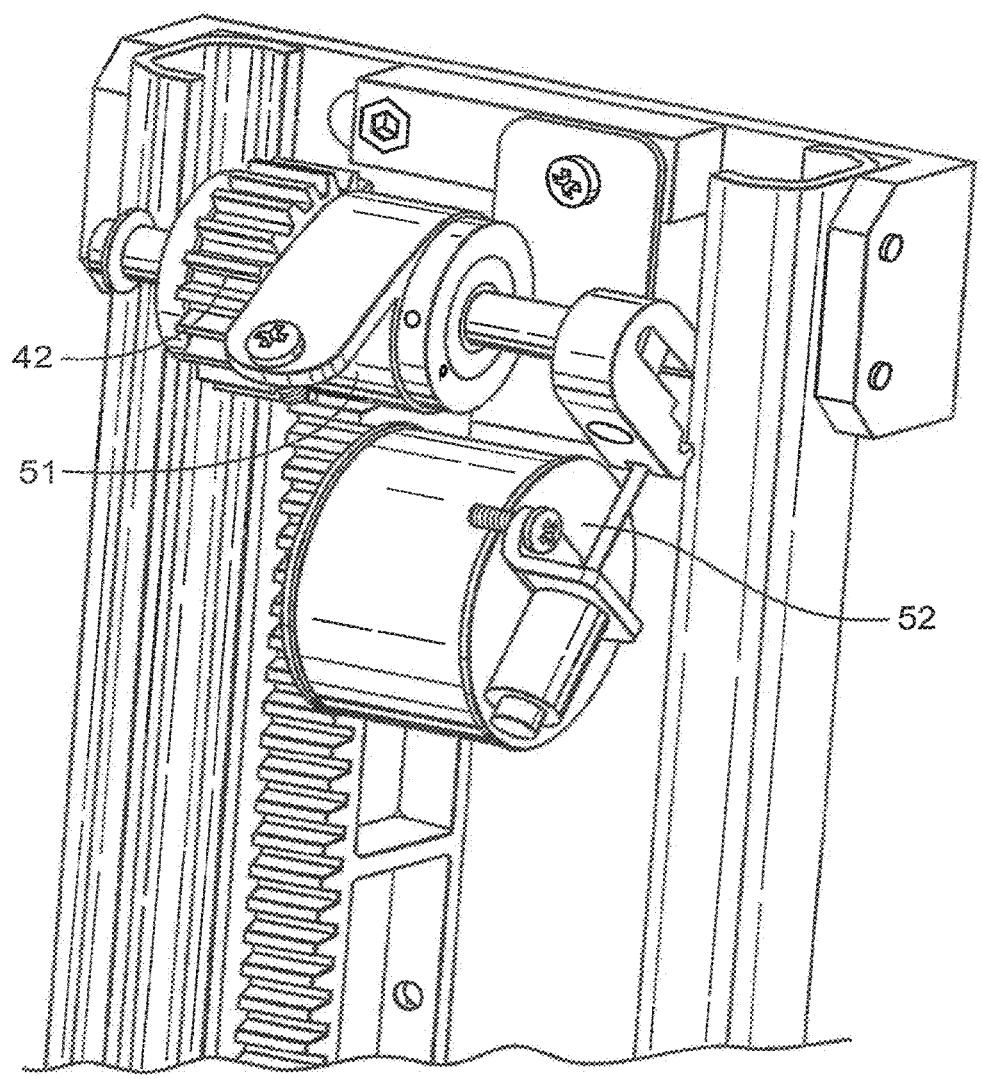
FIG. 10 is a detailed perspective view of a rack and pinion in the support mechanism.

A mechanism for achieving these different positions is shown in FIGS. 8 to 10. As shown in FIG. 8, the foot/legrest 5 is mounted on a support 40 arranged to slide along a track 41, which is inclined at an angle substantially offset from the horizontal and from the vertical so that the foot/legrest moves forward as it moves up the track 41. The angle of inclination may be in the range 20-40° from the vertical, preferably about 30° from the vertical. The support 40 engages a rack 43 extending parallel to the track 41. The foot/legrest 5 is pivotally mounted on the support 40 by means of a locking pivot 44 which allows the foot/legrest 5 to be supported in horizontal, and upwardly inclined positions, as well as being pivoted upwardly into the vertically stowed position. The engagement of the support 40 with the rack 43, and the locking pivot 44, are released by pulling a handle 45 located within a handgrip in the foot/legrest 5.

FIG. 9 shows the support 40 in more detail, without the foot/legrest 5. The handle 45 (not shown in FIG. 9) is connected to a release member 46 mounted within a pivoting connector 47, to which the foot/legrest 5 is attached. The release member 46 is connected to a pin 48 located retractably in a groove 49, so as to secure the pivoting connector 47 in an inclined position. When the handle 45 is pulled, the release member 46 lifts the pin 48 out of the groove 49 and allows the pivoting connector 47 to pivot to the horizontal position.

The locking pivot 44 is preferably arranged to unlock when a torque greater than a predetermined threshold is applied, the threshold being selected such that the foot/legrest 5 will pivot downwardly when stood upon or sat on by a passenger, but will support the feet or legs of a passenger when used as a footrest and a legrest respectively. This is achieved by a pair of inwardly-biased washers 50, at either end of the locking pivot 44, which releasably engage outward parts of the pivoting connector 47 and prevent it from pivoting below the horizontal position. When sufficient force is applied to the locking pivot 44, the inward bias of the washers 50 is overcome and they move outward, disengaging the pivoting connector 47 and allowing it to pivot downwardly. When the pivoting connector 47 is returned to its horizontal position, the washers 50 are biased back into engagement and once again prevent the pivoting connector 47 from pivoting below the horizontal position.

Figure 11:
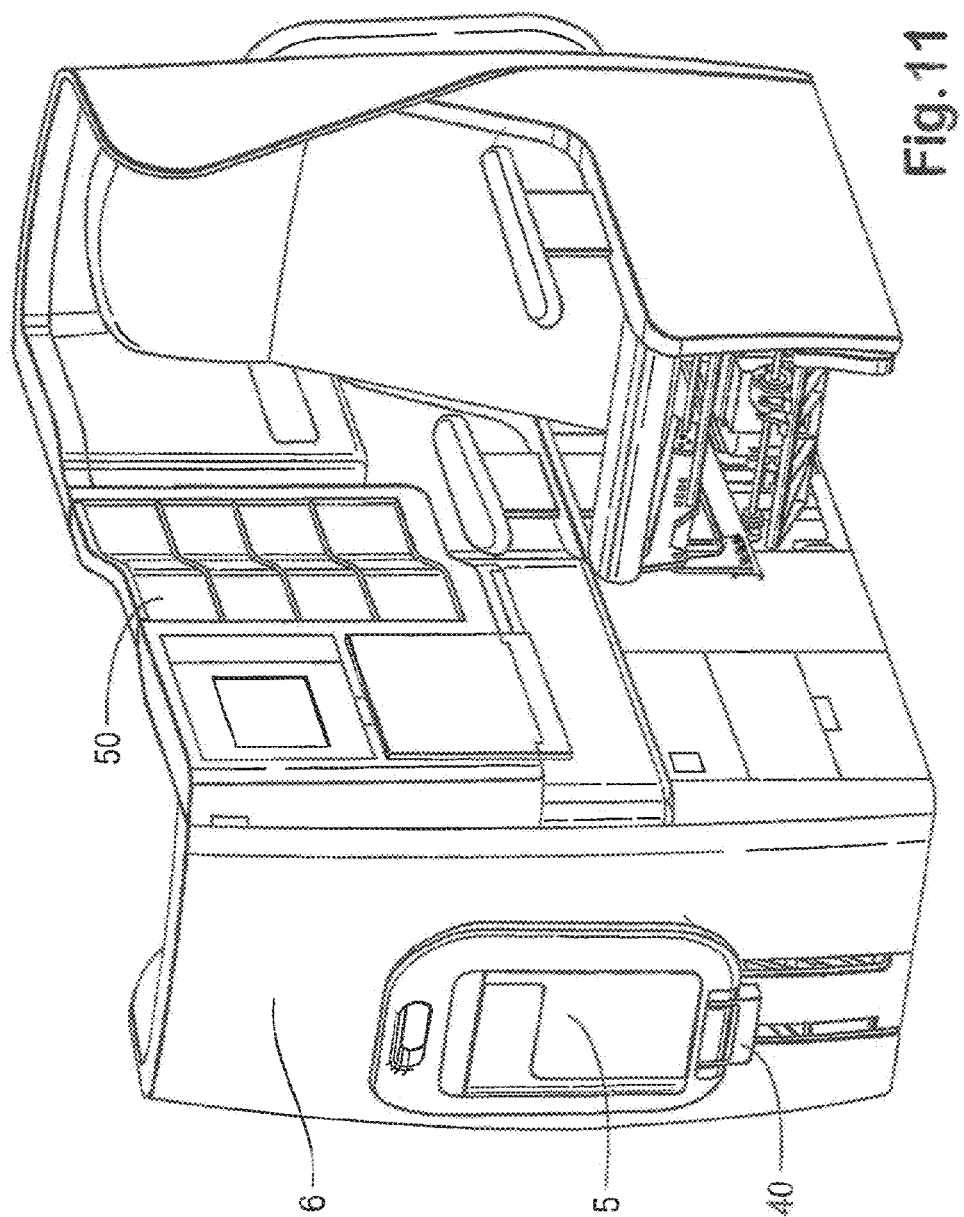
FIG. 11 is a perspective view of the mounting of the support mechanism within the housing of a forwardly adjacent seat.

FIG. 10 shows in detail the mechanism for engaging the support 40 on the rack 43. A pinion 42 runs along the rack 43, and includes a clutch 51 connected to the release member 46 by a linkage (not shown), so that the clutch 51 is disengaged and the support 40 can be moved up or down the track 41 to the desired position when the handle 45 is pulled. When the handle 45 is released, the clutch prevents the pinion 42 from rotating and the support 40 is secured in position on the rack 43. The weight of the foot/legrest 5 is counterbalanced by a torsion spring 52 that applies a torque to the pinion 42. As shown in FIG. 11, the secondary support mechanism may be housed within the housing 6 of the immediately forward passenger seat, so that the mechanism is not visible to passengers and does not present a hazard to them. Where there is no forward passenger seat, the secondary support mechanism may be housed in a partition wall or a discrete housing.

Passenger Seating Layout

Figure 12:
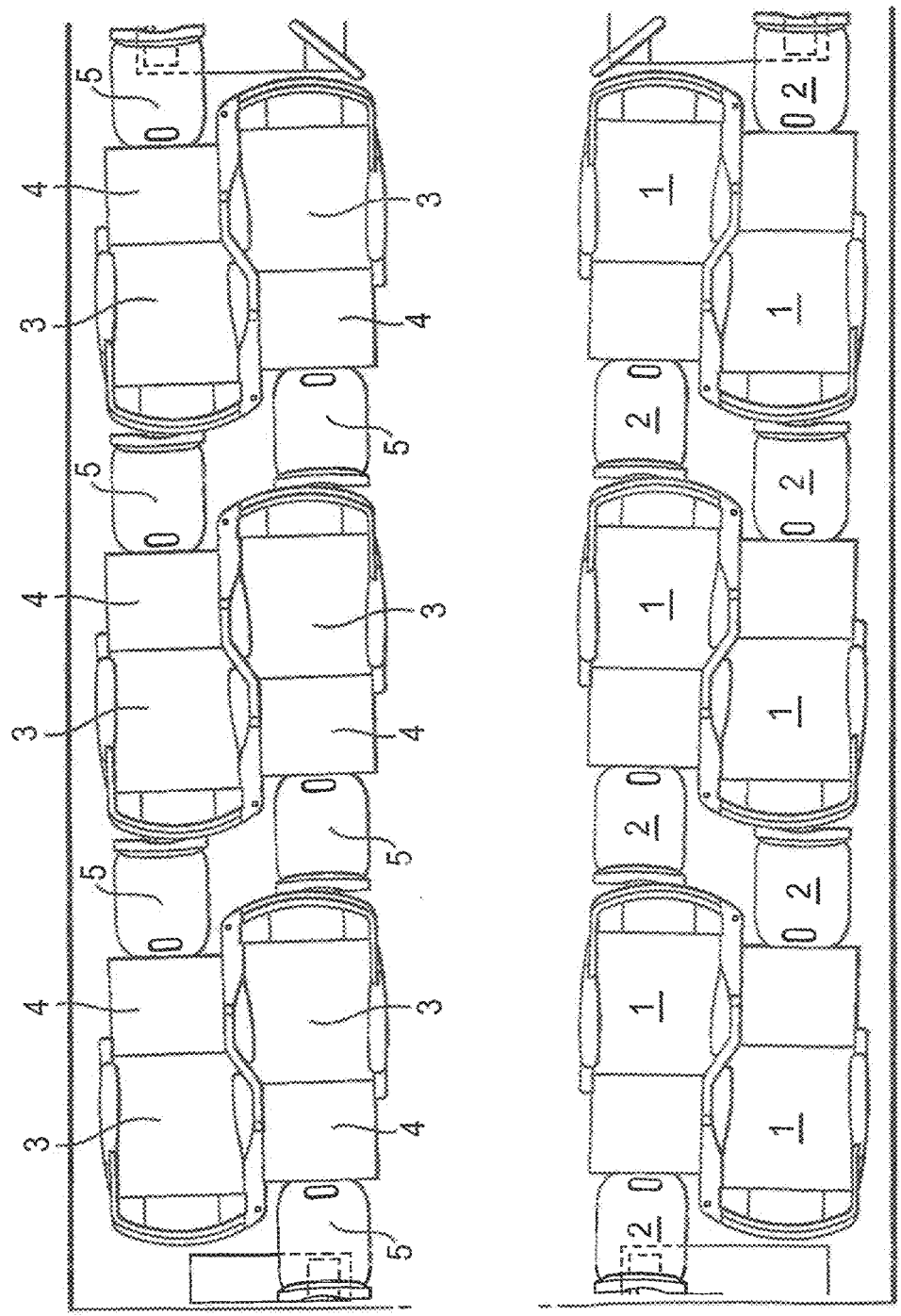
FIG. 12 is a plan view of a seat layout in the cabin of an aircraft.
Figure 12A:
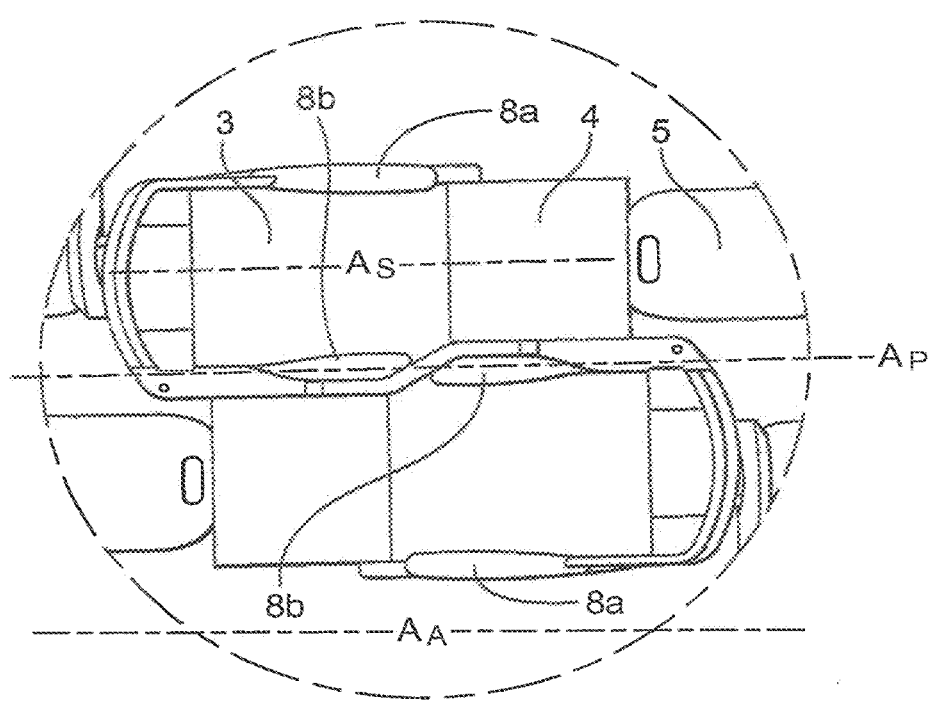
FIG. 12a shows an oppositely facing pair of seats in the layout of FIG. 12.

FIG. 12 show an example of a passenger seating layout comprising twelve passenger seating arrangements, each comprising a primary seat 1 and a secondary support 2, arranged in oppositely-facing pairs, as shown in more detail in FIG. 12*a*. In each pair, one seat faces approximately forwardly and the other faces approximately rearwardly in the aircraft, parallel to a longitudinal seat pair axis $A_P$ which is at a slight angle, for example 2°, to the longitudinal axis of the aisle $A_A$. The longitudinal axis $A_S$ of each seat of a pair is substantially parallel to the longitudinal axis of the seat pair $A_P$. This slight angle allows greater waist and shoulder width for each primary seat 1, given a minimum width for the aisle. The outer armrests 8*a* extend substantially parallel to the aisle axis $A_A$.

Privacy Screen

Figure 13A:
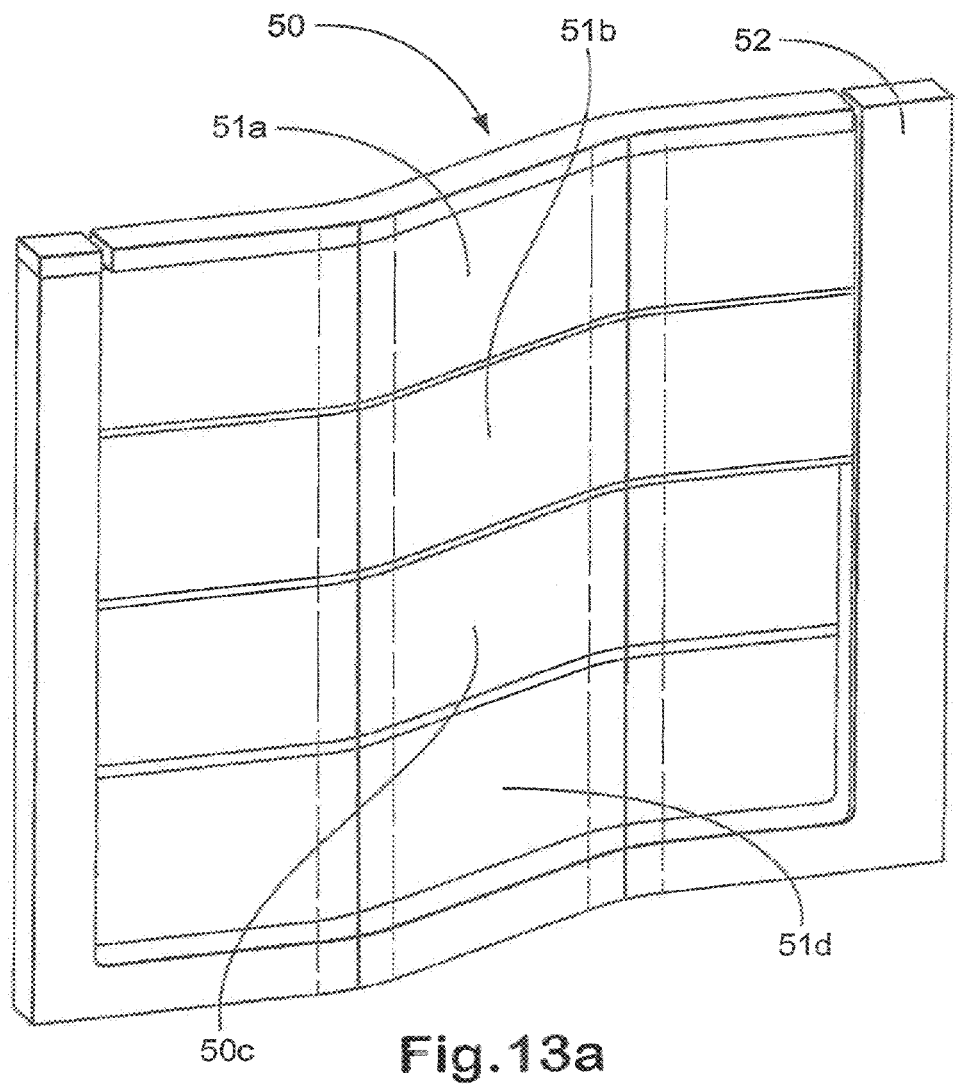
FIGS. 13a and 13b show a privacy screen in raised and lowered configurations respectively.
Figure 13B:
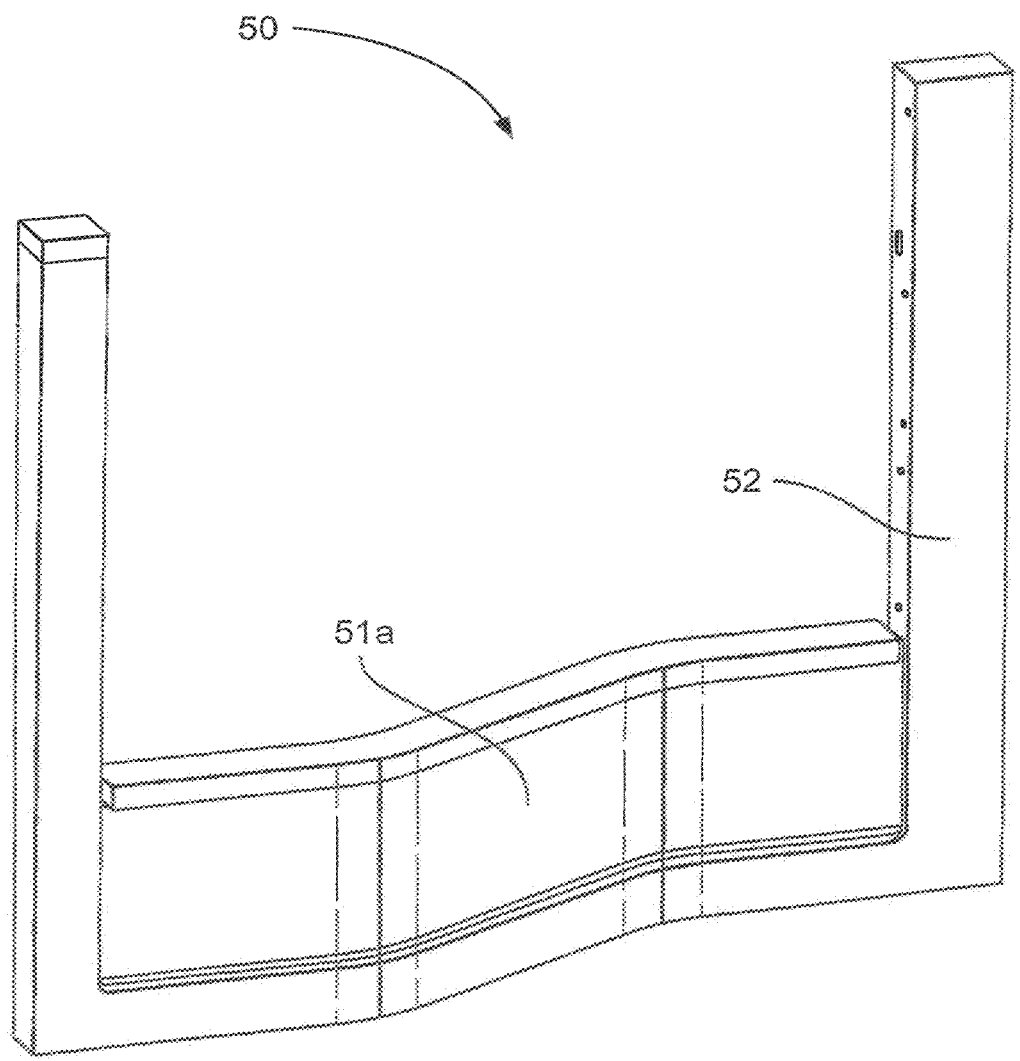

As can be seen from FIG. 11, a privacy screen 50 is provided between each seat of a seat pair. The privacy screen 50 may be raised, as shown for example in FIGS. 1*a* to 1*d*, to provide privacy between passengers in different seats of the seat pair, or retracted so as to allow interaction between the passengers. As shown in FIGS. 13*a* and 13*b*, the privacy screen 50 comprises a plurality of horizontal slats 51*a*-51*d* slidable vertically in a frame 52. Each slat engages the adjacent slat(s), either directly or via connecting portions housed within the frame 52, so that lifting the top slat 51*a* lifts all of the slats 51*a*-51*d* into the raised position.

As shown in FIG. 13*c*, the top slat 51*a* is secured in its raised position by an electrically operable latch, in the form of an electromagnet 53. The privacy screen 50 may be released manually by pushing the top slat 51*a* downwards with sufficient force to overcome the magnetic force of the electromagnet 53. The electromagnet 53 is powered by the power supply to the seat. In an emergency, the power supply to each seat may be disconnected momentarily, such that the privacy screen 50 automatically drops into its retracted position under gravity. This allows the passenger to reach an oxygen mask that automatically drops from a ceiling compartment. Since the ceiling compartment may not be directly above some of the seats, it is advantageous to allow passengers to reach over the privacy screen 50 in an emergency.

The privacy screen 50 may include a switch, located in or adjacent to the frame, that locally disconnects the power to the electromagnet 53 and allows the privacy screen 50 to be lowered without applying a downward force, as well as allowing the automatic dropping of the privacy screen 50 to be tested. The switch may be located where it can be conveniently actuated by cabin crew.

The slats 51 are preferably made from a translucent material, so that natural light from cabin windows can pass through the privacy screen 50. Most preferably, as shown in FIG. 14, the slats 51 are transparent when viewed at a predetermined range of angles α-β relative to the horizontal plane, but are otherwise translucent, or opaque. The angles α and β are selected so that a member of cabin crew CC is able to see downwardly through the privacy screen 50 when raised, to determine whether a passenger's seatbelt is correctly fastened, but adjacent passengers P1, P2 cannot see each other when both seated. Thus, the material may have a vertical transparency angle range of about 10° to 70°, preferably 25° to 55°. Preferably, the transparency is substantially independent of horizontal viewing angle, but in an alternative embodiment the screen 50 may be translucent when viewed at a high horizontal angle, such as 50° or greater, in one embodiment, the slats 51 are of transparent plastic covered with a film of directionally transparent material, such as currently sold under the brand name Lumisty™ of Sumitomo Chemical Co. Ltd.

Alternative Embodiments

The above embodiments illustrate, but do not limit, the present invention. Alternative embodiments which may occur to the skilled reader on reading the above description may also fall within the scope of the invention.

The invention claimed is:

1. An aircraft passenger seat having a housing associated with the seat that at least partially surrounds the seat, the housing having a privacy screen arranged to retract automatically under the force of gravity in response to disconnection or reduction of electrical power to the seat.

2. The seat of claim 1, wherein the privacy screen is biased towards a retracted position thereof, the seat including a latch for latching the privacy screen in a deployed position thereof.

3. The seat of claim 2, wherein the latch is electrically energized and arranged to release the screen when electrical power to the latch is disconnected or reduced.

4. The seat of claim 3, wherein the latch comprises an electromagnet powered by the electrical power to the seat.

5. The seat of claim 3, including a switch arranged to locally disconnect the electrical power to the latch so as to allow the screen to retract.

6. The seat of claim 1, wherein the screen comprises a plurality of substantially horizontal slats slidable in a substantially vertical direction between a deployed position and a retracted position.

7. The seat of claim 6, wherein each said slat directly or indirectly engages an adjacent one of said slats, such that the screen is moveable from the retracted position to the deployed position by raising an upper one of the slats.

8. The seat of claim 6, wherein the screen is moveable from the deployed position to the retracted position by releasing an upper one of the slats.

9. The seat of claim 1, wherein the screen has a transparency dependent on vertical viewing angle, such that the screen is not transparent at a low vertical viewing angle but is transparent at a high vertical viewing angle.

10. The seat of claim 9, wherein the screen is translucent or opaque at said low viewing angle.

11. The seat of claim 9, wherein said high vertical viewing angle is in the range of 20° to 70° to the horizontal.

12. The seat of claim 11, wherein said high vertical viewing angle is in the range of 25° to 55° to the horizontal.

* * * * *